United States Patent [19]

Over et al.

[11] Patent Number: 4,489,476
[45] Date of Patent: Dec. 25, 1984

[54] MODULAR LEAD MAKER

[75] Inventors: William R. Over; Donald A. Wion, both of Harrisburg; Richard M. Heffner, West Lawn, all of Pa.

[73] Assignee: AMP Incorporated, Harrisburg, Pa.

[21] Appl. No.: 497,931

[22] Filed: May 25, 1983

[51] Int. Cl.³ .............................................. B23P 19/04
[52] U.S. Cl. .................................. 29/564.4; 29/33 M; 29/566.3
[58] Field of Search ................. 29/33 M, 564.2, 564.6, 29/564.7, 564.8, 566, 747, 749, 748, 564.1, 566.3, 564.4; 81/9.51

[56]  References Cited
U.S. PATENT DOCUMENTS

| | | | |
|---|---|---|---|
| 2,954,599 | 10/1960 | Cootes et al. | 81/9.51 |
| 3,019,679 | 2/1962 | Schwalm et al. | 81/9.51 |
| 4,135,558 | 1/1979 | Ragard et al. | 29/566.3 X |
| 4,184,236 | 1/1980 | Nuh | 29/564.1 X |
| 4,196,510 | 4/1980 | Gudmestad et al. | 29/33 M X |
| 4,361,942 | 12/1982 | Mazzola et al. | 29/33 M |
| 4,367,575 | 1/1983 | Forster et al. | 29/33 M |

Primary Examiner—William R. Briggs
Assistant Examiner—Glenn L. Webb
Attorney, Agent, or Firm—F. Brice Faller

[57] ABSTRACT

Lead making apparatus has normally aligned transfer heads with conductor cutting and stripping blades therebetween. Each head is mounted on a rotatable transfer head shaft and has a slide with a clamp thereon through which wire is fed and clamped. The slides carry followers in respective first arcuate track segments which pivot to pull the slides away from each other for insulation stripping. The transfer head shafts rotate in opposite directions through ninety degrees to align stripped ends with terminating stations as the followers ride through first arcuate track segments into second arcuate track segments, each pair of track segments forming a continuous ninety degree arc of circular track. The second track segments pivot an adjustable amount to push the slides forward for inserting conductor into terminals to an adjustable degree. Transfer head shafts carry pinion gears fixed thereto against rotation and driven by a rack which reciprocates intermittently. Shafts have cylindrical tracking cams on the lower ends opposite the transfer heads, each having two circumferential tracks which contain two pairs of diametrically opposed followers on linkage which causes vertical movement of shafts. Only one track is profiled to closely contain its pair at a given stage of shaft rotation, so that vertical movement can be varied with angular position of the shaft. The linkage which controls vertical movement when heads are aligned with terminating stations is adjustable. A single camshaft carries tracking cams which control pivotal movement of track segments and vertical movement of the transfer head shafts. Shifting mechanism on linkage for vertical movement permits a different tracking cam for each transfer head to control vertical movement thereof as necessary for open barrel or closed barrel terminals.

7 Claims, 27 Drawing Figures

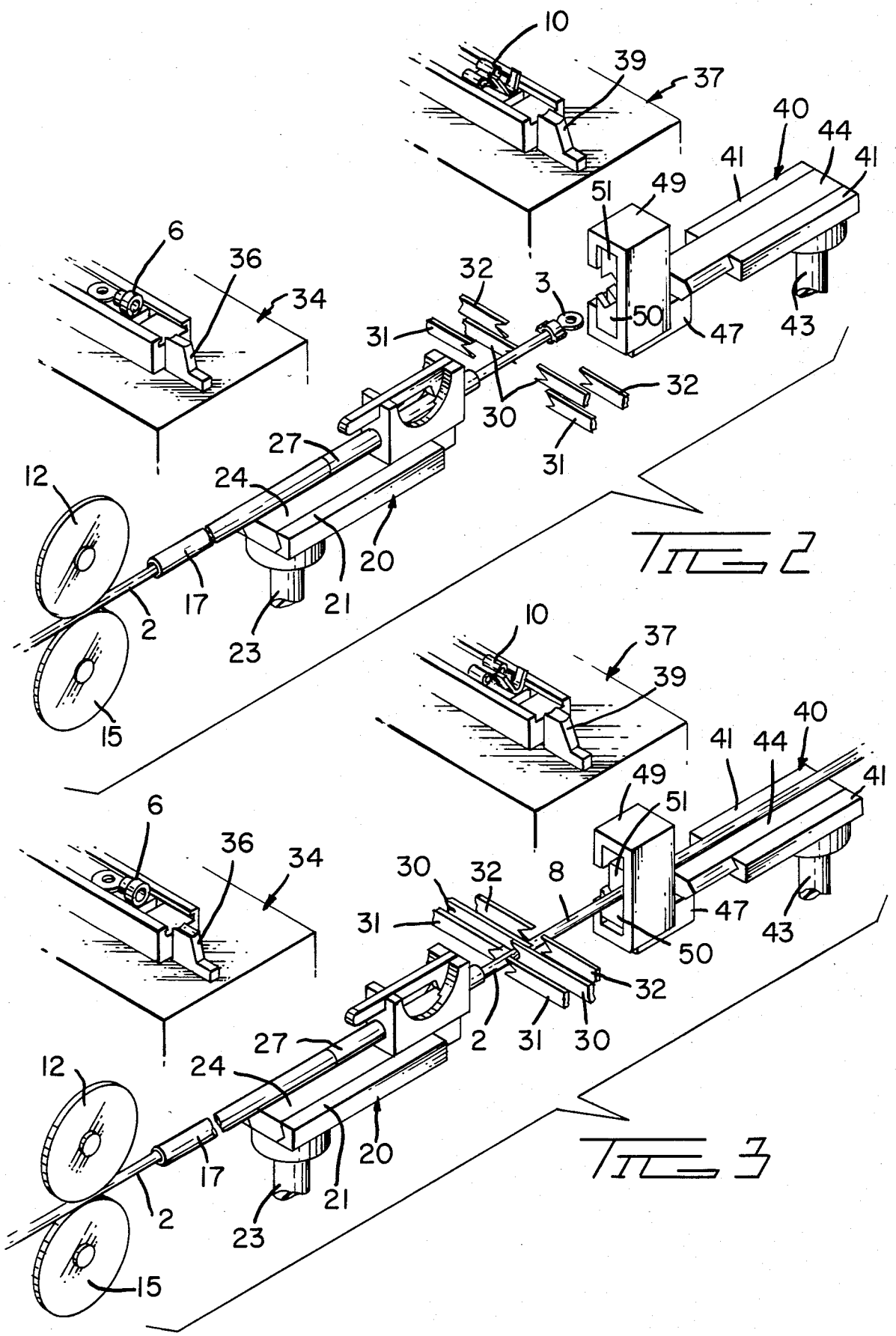

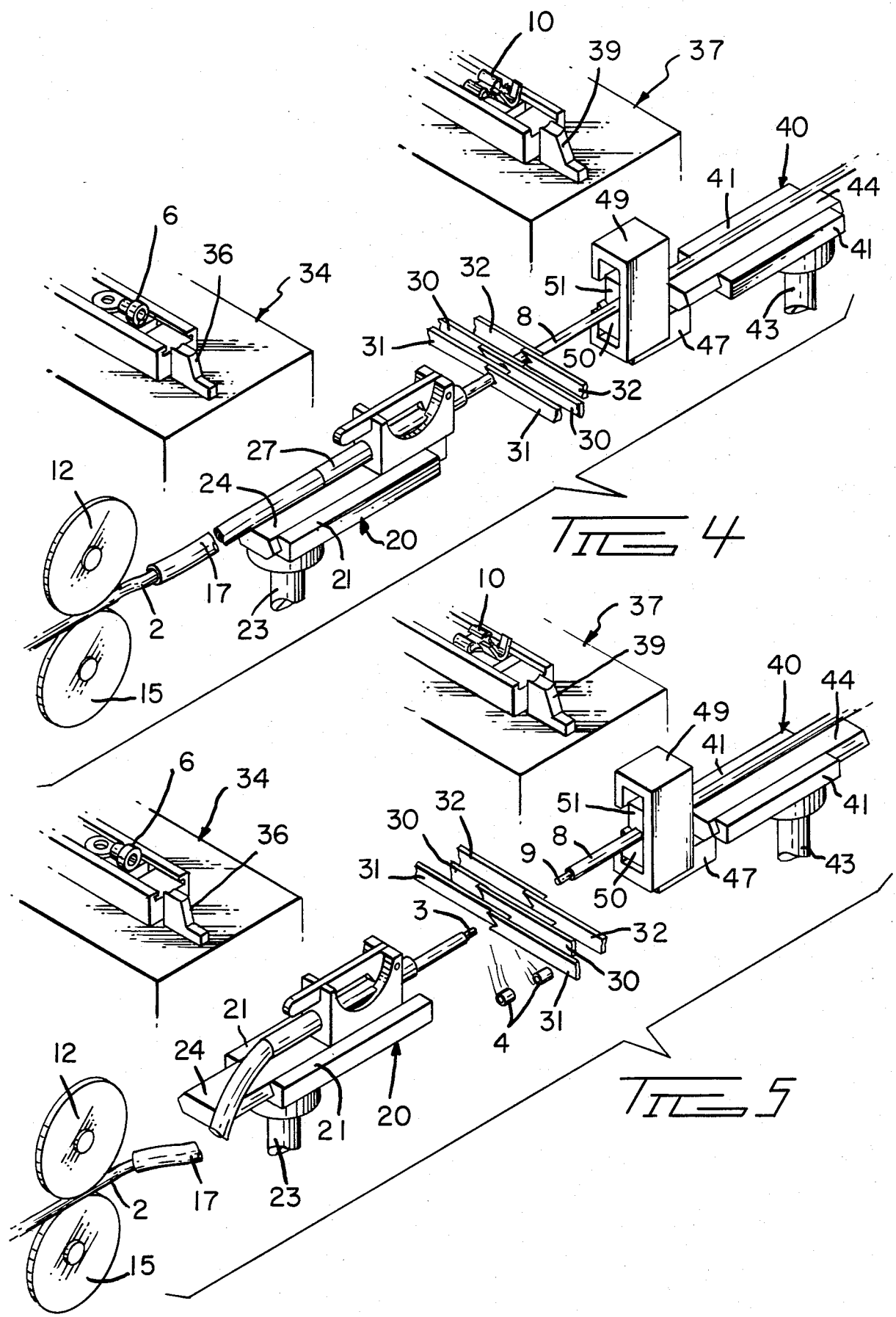

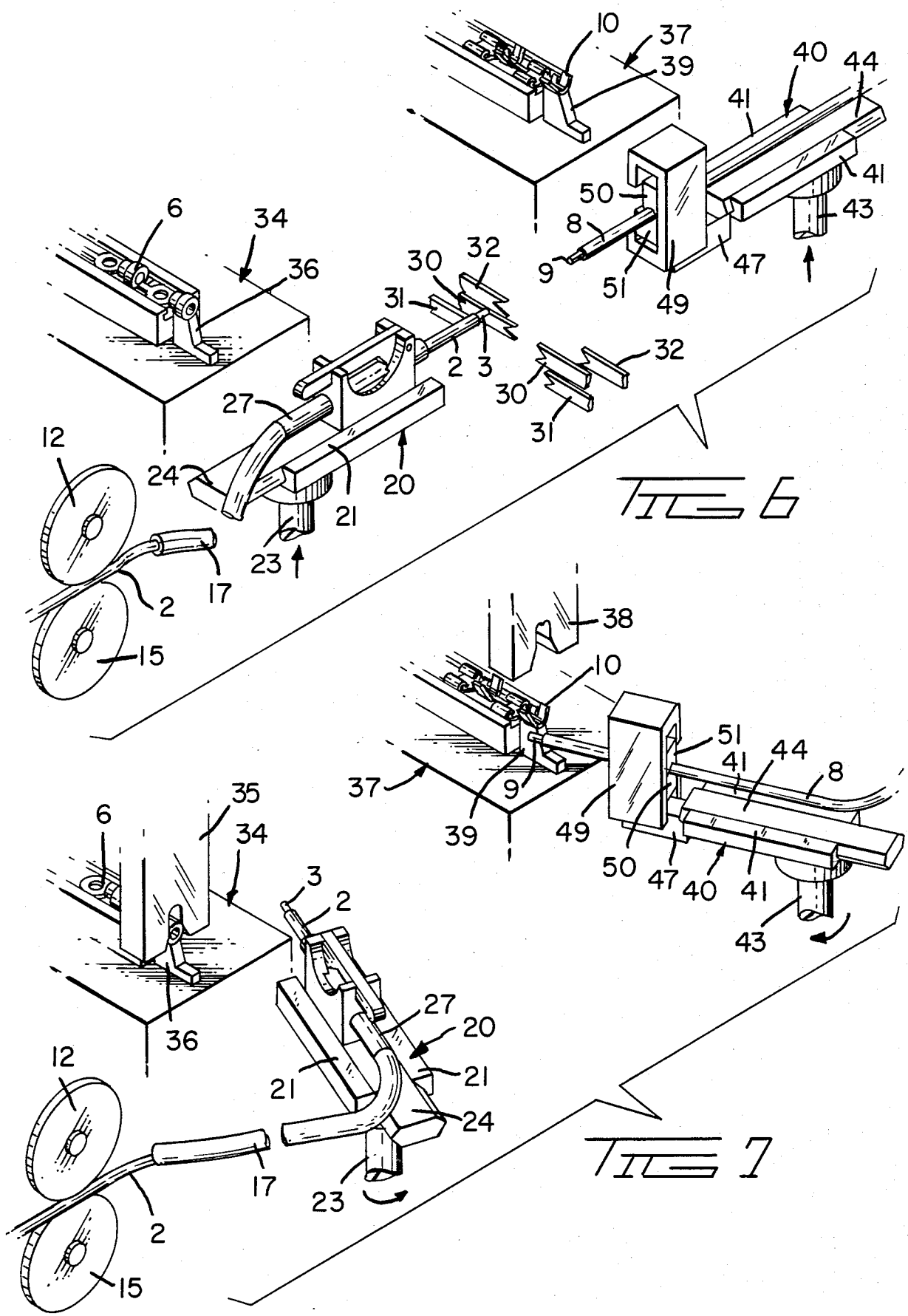

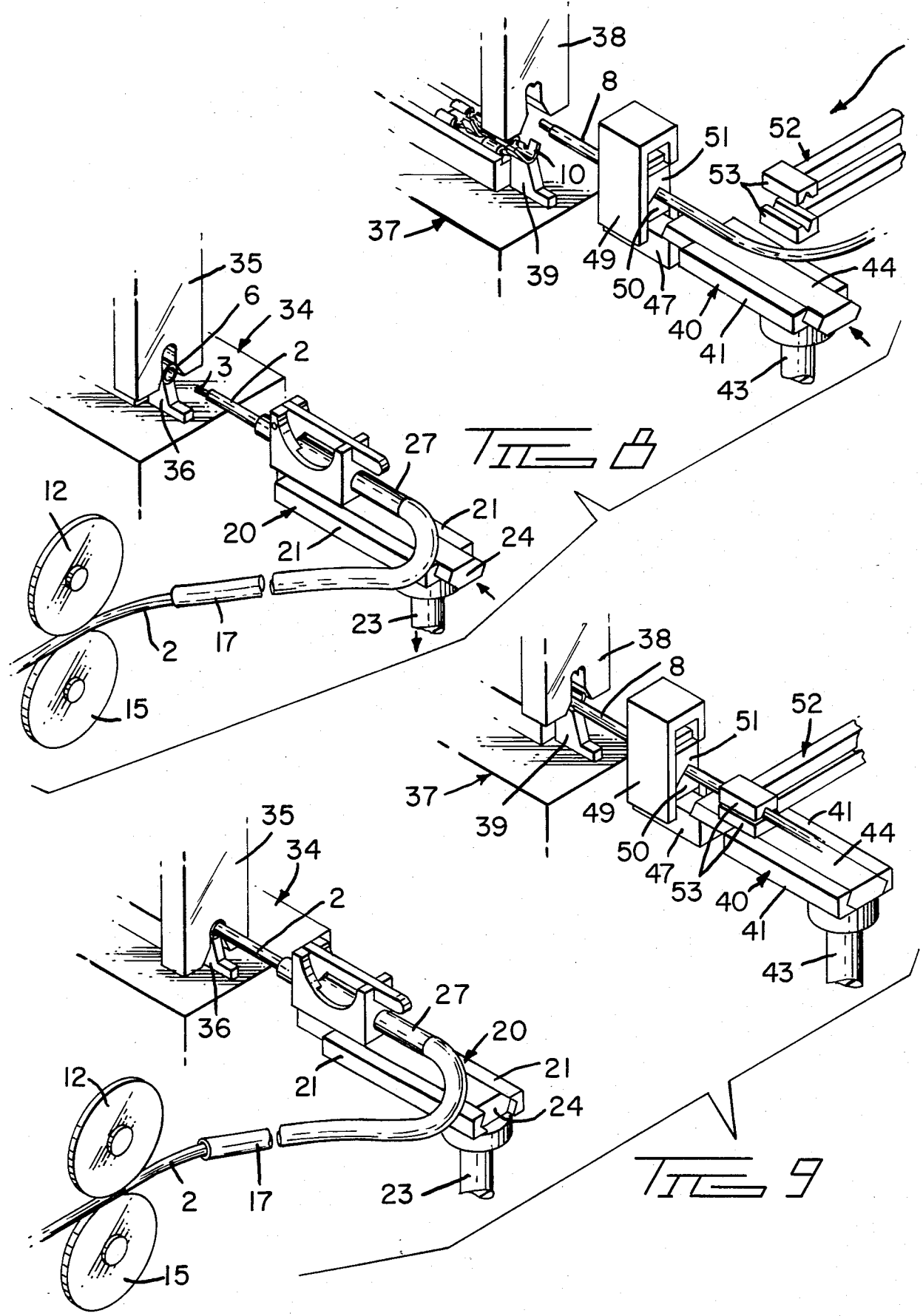

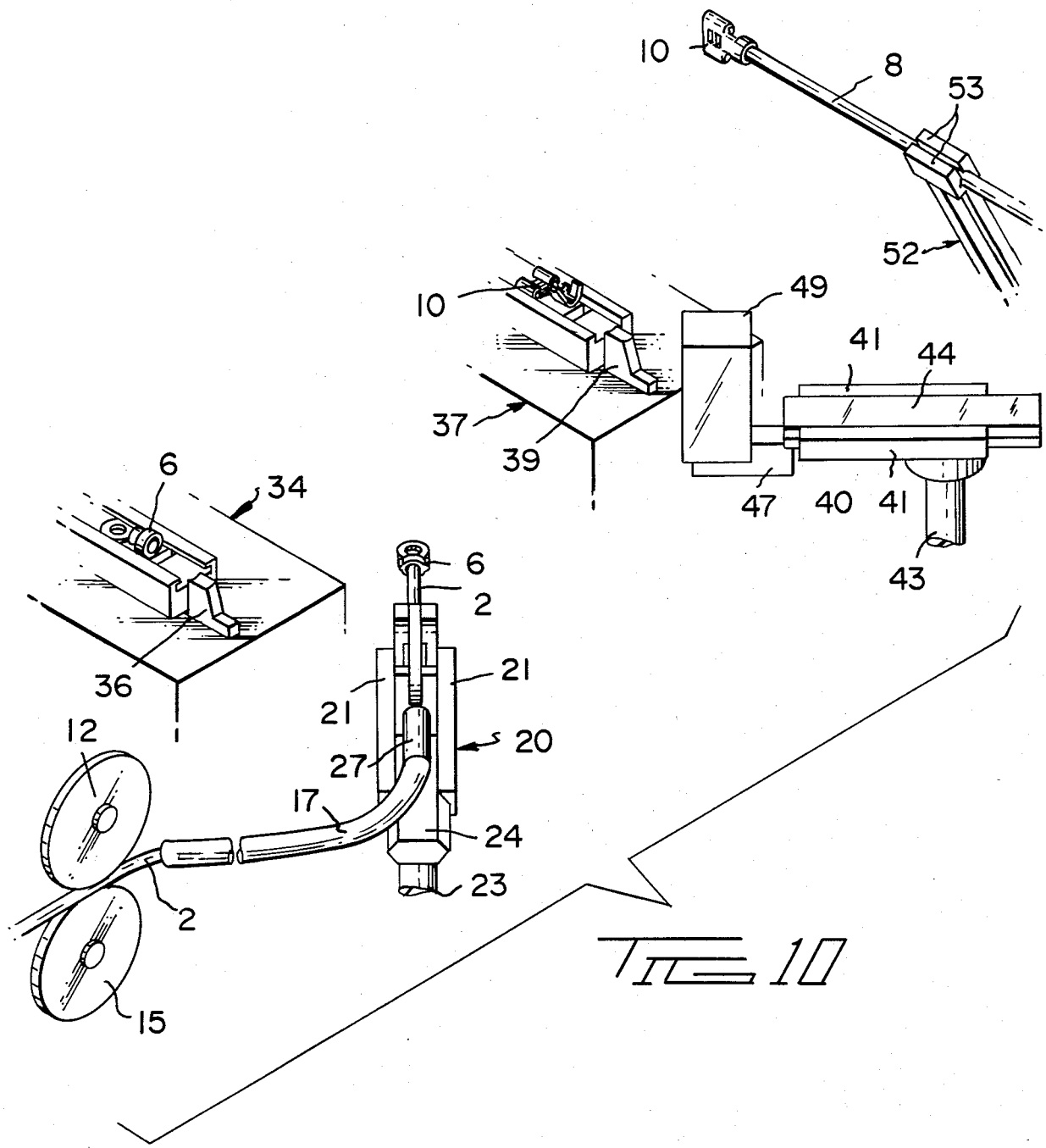

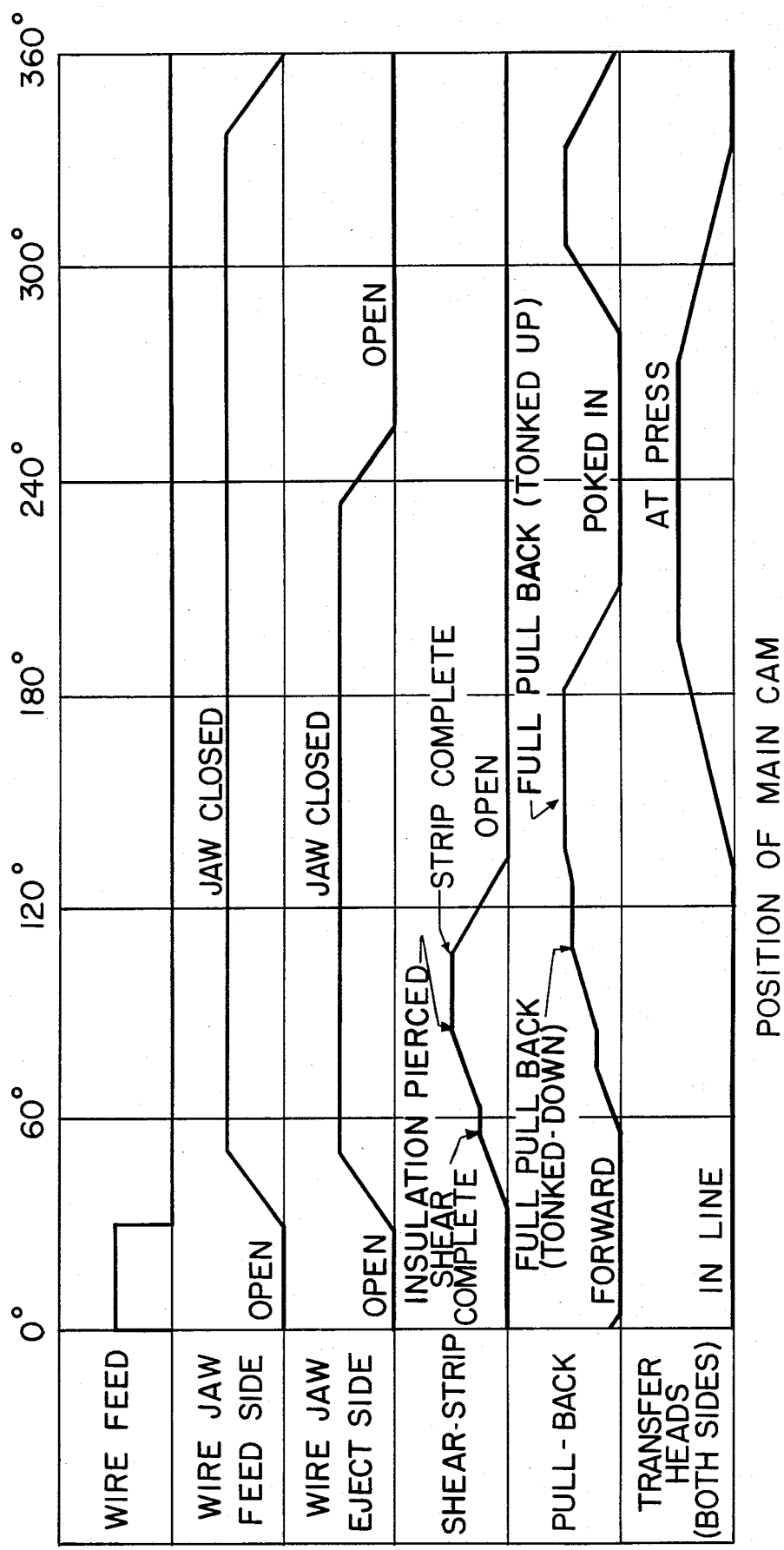

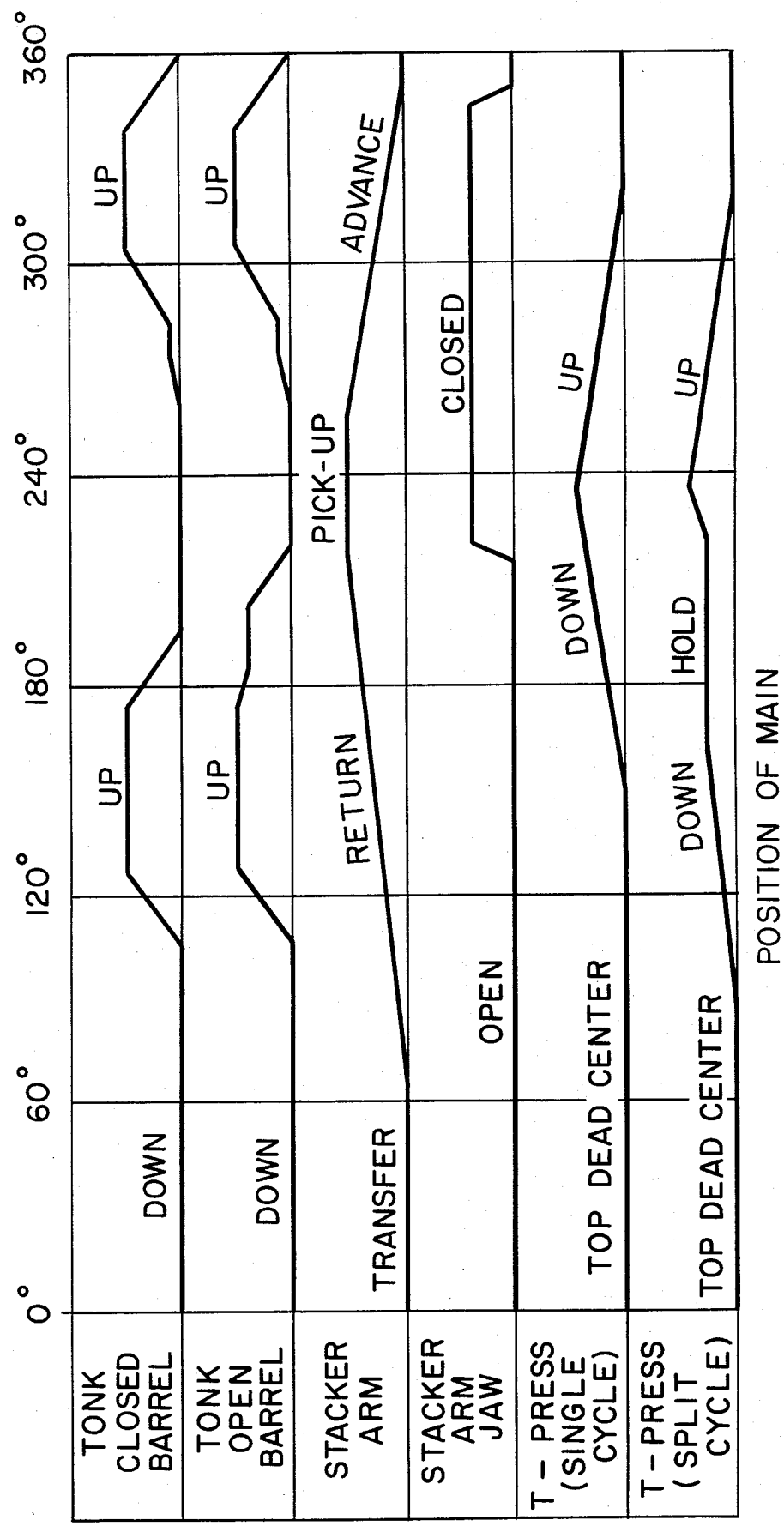

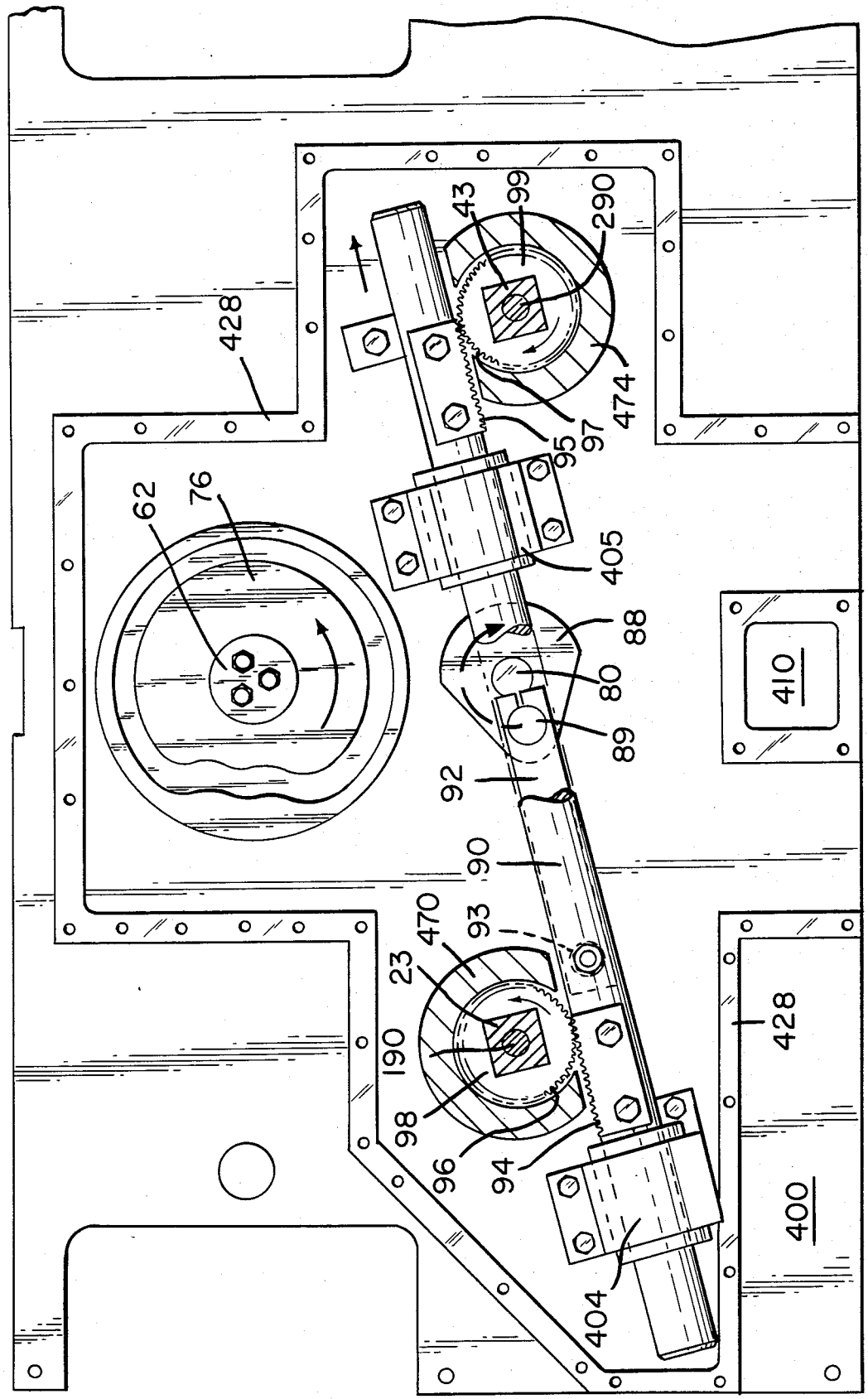

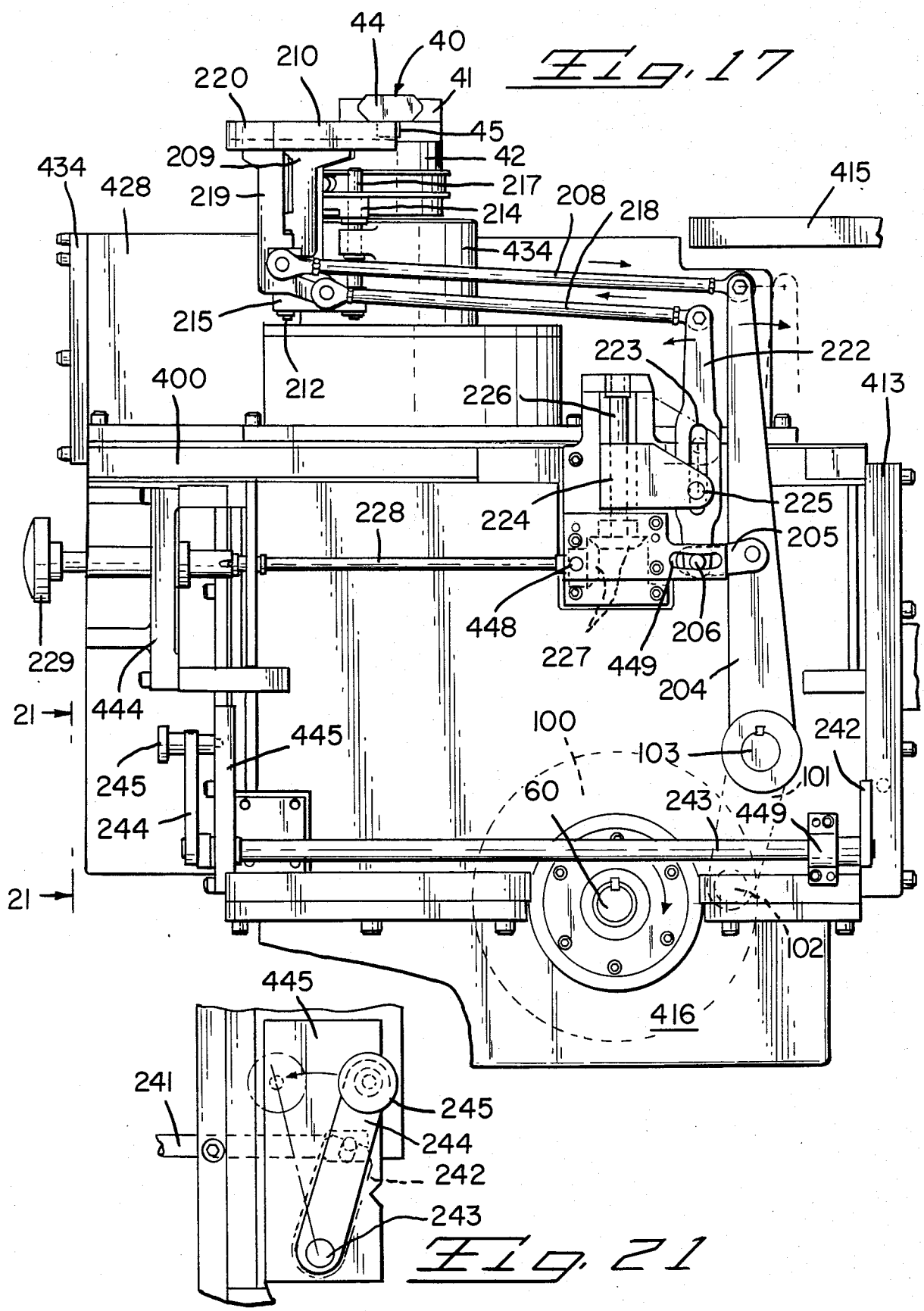

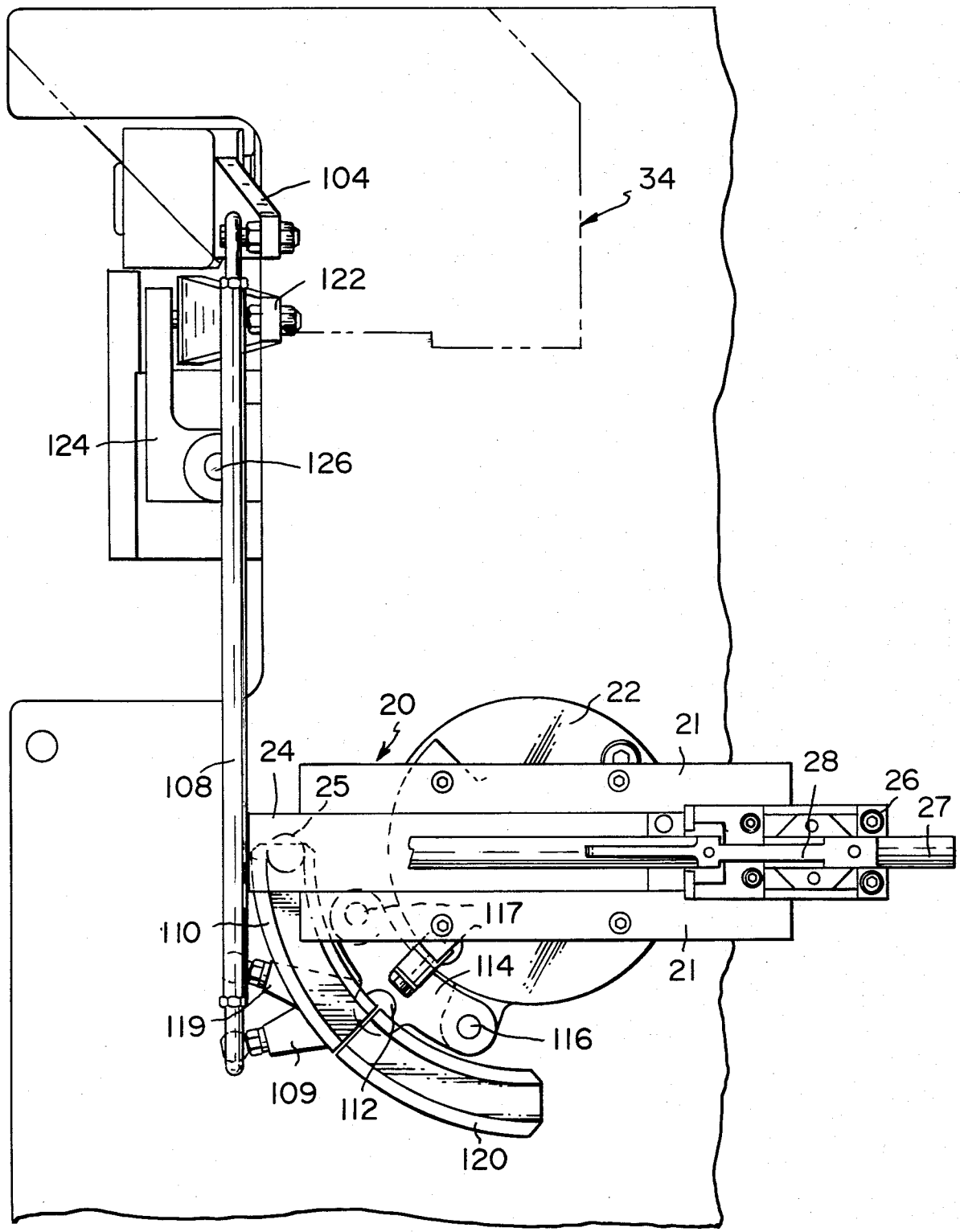

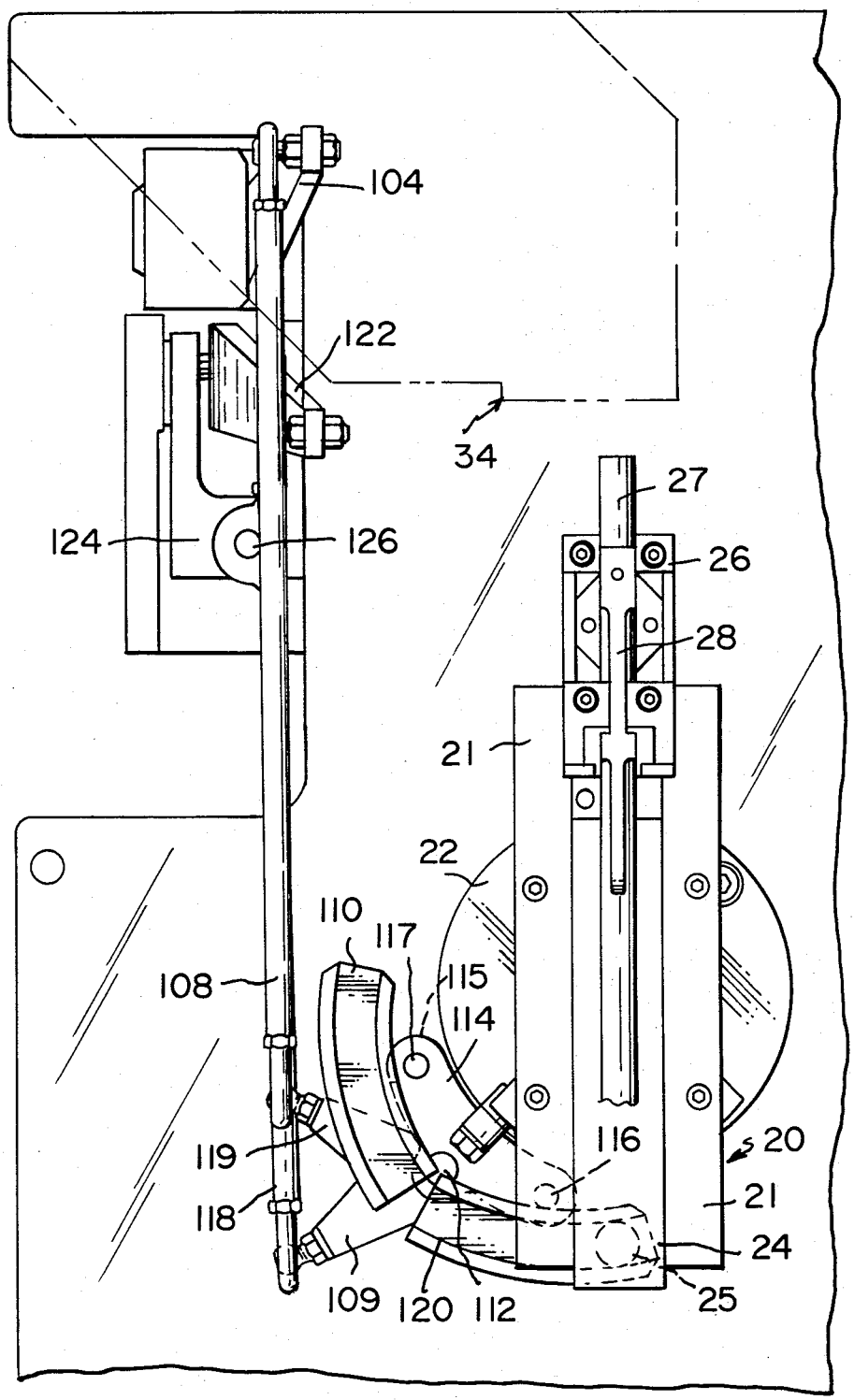

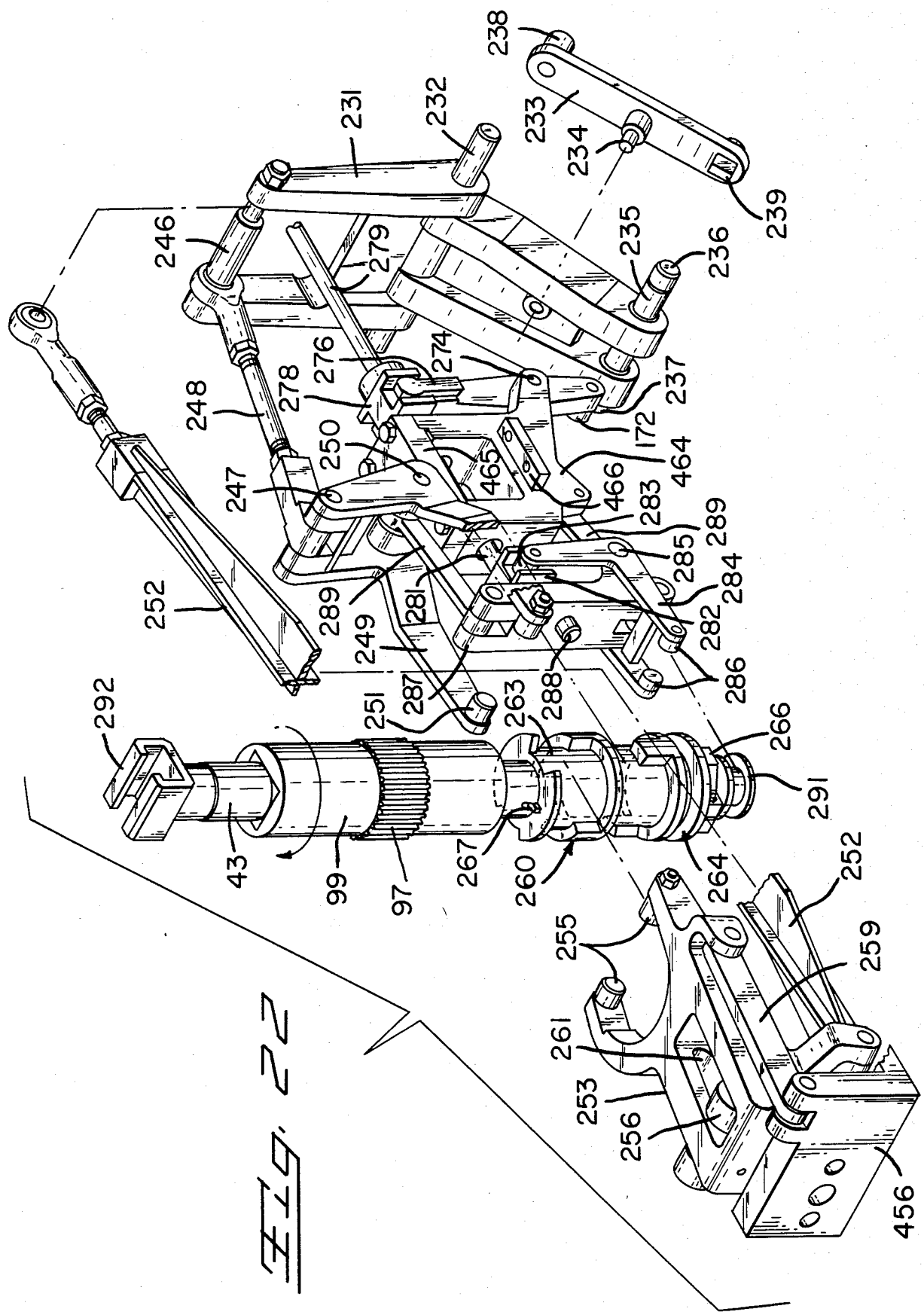

MODULAR LEAD MAKER

BACKGROUND OF THE INVENTION

The present invention relates to lead making apparatus, and particularly to apparatus for automatically applying leads to opposite ends of electrical terminals.

Apparatus for making electrical leads are well known. U.S. Pat. No. 3,019,679 discloses such an apparatus of the type comprising a pair of normally aligned conductor transfer heads fixed on vertical transfer head shafts, conductor cutting and stripping means comprising closable blades positioned between said transfer heads, and conductor feed means for feeding a predetermined length of wire through said transfer heads and between said blades. The apparatus further comprises a pair of conductor terminating stations remote from said cutting and stripping means and means for rotating the transfer heads from their normally aligned positions to positions adjacent respective terminating stations, the means for rotating the transfer heads acting on the transfer head shafts. Means for moving each of the transfer heads vertically is provided. Each transfer head carries a slide member which is movable toward and away from the blades when the heads are aligned, and toward and away from said terminating stations when the transfer heads are adjacent the terminating stations, and clamping means on each of the slide members for clamping fed conductor at the conclusion of feeding thereof.

In the above described apparatus, the means for moving the transfer heads vertically comprises respective links which are pivotally mounted at one end and bifurcated at the other end where they attach to spindles axially fixed on the transfer head shafts. Continuously rotating roller cams acting on the lever arms intermediate the ends effect vertical movement of the shafts, which may be adjusted by varying the height of the pivot end of the links. The vertical movement is not controlled independently between the normally aligned and terminating positions of the heads; limits of vertical movement are thus the same at both positions. Further, the timing of the vertical motion of the transfer head shafts cannot be changed without changing the roller cams. Thus, when it is desired to change from open barrel to closed barrel type terminals, considerable down time is required for the change.

For other prior art lead makers employing mechanical linkages, see U.S. Pat. Nos. 2,954,599 and 3,030,694. It should be noted that several manufacturers provide lead making equipment which utilizes numerous pneumatically controlled mechanisms. These suffer the disadvantage of lower lead-making speed and more frequent maintenance due to numerous valves and switches.

SUMMARY OF THE INVENTION

The present invention is characterized in that the means for moving a transfer head vertically comprises a cylindrical tracking cam fixed to the respective transfer head shaft, each cam having an upper circumferential track and a lower circumferential track having respective upper and lower cam followers therein. The cam followers are carried by means for moving the followers vertically and travel through respective tracks as the shaft is rotated. Only one of said tracks on each cam is profiled to closely contain the respective follower when the heads are aligned and only the other track on each cam is profiled to closely contain the respective follower when the heads are adjacent the terminating stations; thus, only one of the followers controls vertical movement at each position of the heads.

The invention offers the advantage that the vertical movement at each position is independently controlled so that the conductor may be at a different height for termination than for cutting and stripping, as is required by some applicators and terminals. Further, as the height of the follower which controls vertical movement at the presses is adjustable, the apparatus may be readily adapted to different terminals and applicators without affecting the height of the transfer heads at the cut-and-strip position.

According to another aspect of the invention, the apparatus is characterized in that the means for moving a transfer head vertically comprises a cylindrical tracking cam fixed to the respective transfer head shaft, each such cam having a circumferential track having a cam follower therein. The follower is journaled to a link which pivots to move the shaft vertically, the link being driven by a connecting rod which is reciprocably driven by a shifter frame which pivots about a rocker shaft which is parallel to a camshaft carrying first and second tracking cams which flank the shifter frame. The shifter frame slidably carries a lower shaft, parallel to the rocker shaft, having first and second followers axially journaled to opposite ends thereof. The frame also carries linkage for shifting the lower shaft axially in one direction so that said first follower engages the first tracking cam and axially in the opposite direction so that the second follower engages the second tracking cam. Thus, two distinct timings of vertical transfer head movement are achieved, and shifting from open barrel to closed barrel termination is readily accomplished.

All wire handling elements are moved by mechanical linkage which permits higher speed and less down time than experienced with pneumatic equipment.

BRIEF DESCRIPTION OF THE DRAWINGS

FIGS. 2 through 10 are sequential schematic perspectives of the wire handling components of the lead maker.

FIGS. 11A and 11B are timing diagrams.

FIG. 16 is a plan view of the transfer head drive rack taken along line 16—16 of FIG. 13.

FIG. 17 is an end view of the push-pull mechanism and linkage.

FIG. 18A is a plan view showing the wire transfer head prior to rotation.

FIG. 18B is a plan view showing the wire transfer head fully rotated.

FIG. 21 is an elevation view of the cam shifter lever taken along line 21—21 of FIG. 17.

FIG. 22 is a partially exploded perspective of the tonk transfer linkage.

DETAILED DESCRIPTION OF THE INVENTION

In the following description, the term "wire" is employed with reference to a substantially endless insulated conductor such as that provided on a reel, while the term "lead" is employed with reference to severed sections of the conductor which are ultimately ejected from the apparatus. The term "conductor" is employed in a generic sense to include both wire and lead.

Figure 1:
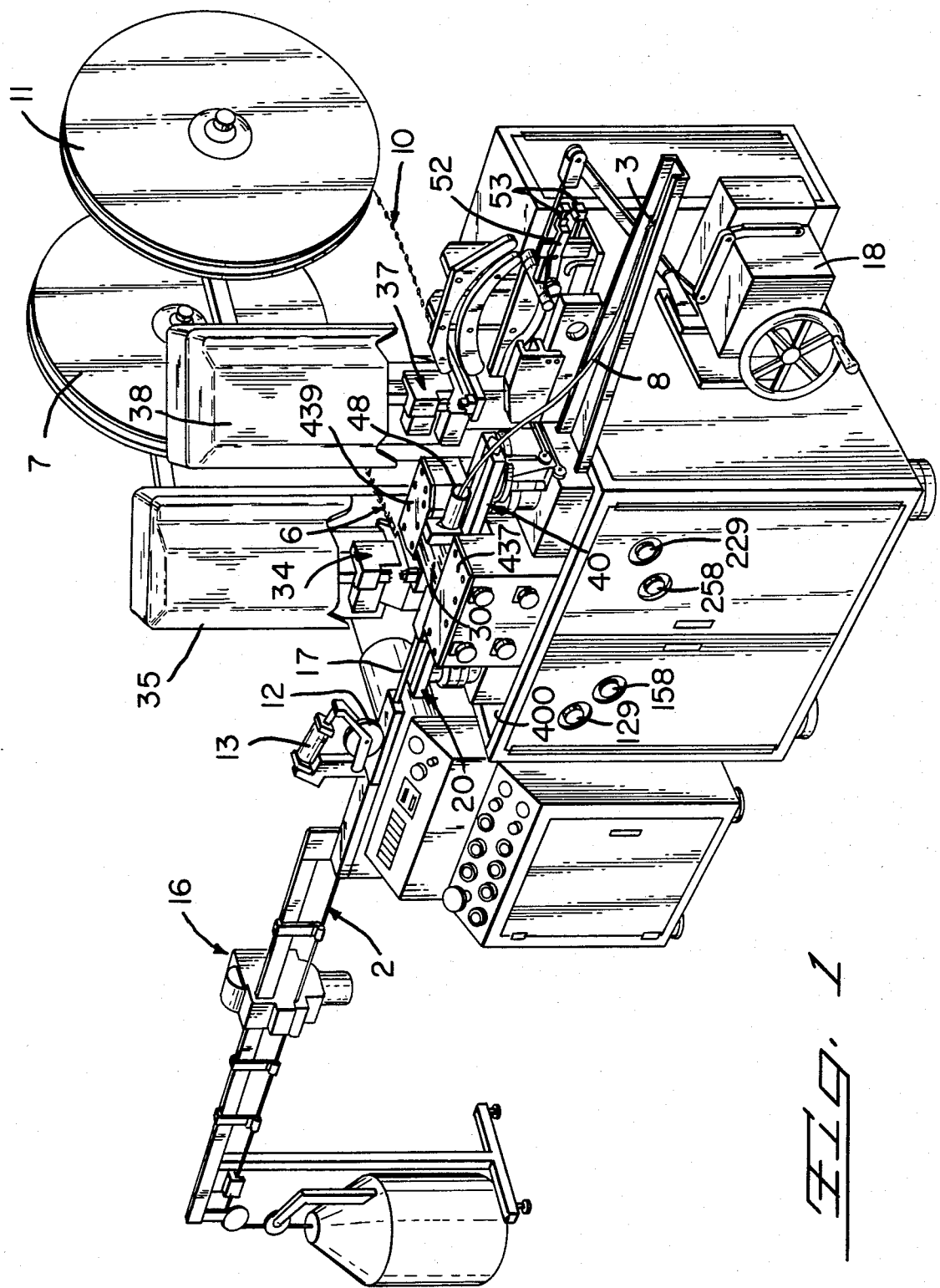
FIG. 1 is a perspective of the lead maker, cabinet, and associated apparatus.

FIG. 1 is a perspective of the modular lead maker which is provided with wire 2 drawn from a substantially endless source through a wire marker 16 by wire feed means including an idler wheel 12 which is pressed against the wire 2 by air cylinder 13. The wire 2 then passes through a flexible guide tube 17, past wire transfer head 20, through cutting blades 30, through open-sided wire guide 48, and past transfer head 40 where it becomes lead 8 with leading end 3. The leading end of wire 2 and trailing end of lead 8 are rotated through ninety degrees after cutting and stripping to positions at wire terminating station 34 and lead terminating station 37, which parallel the feed path. Here presses 35, 38 terminate the wire 2 and lead 8 to terminals 6, 10 fed in strip form from reels 7, 11 respectively. Stacker arm 52 swings jaws 53 over toward station 37 so that the jaws 53 can retrieve the finished lead. The latter movements are controlled by linkage in box 18; this linkage is driven off the right end of the main camshaft which will be later described. Other salient features visible in FIG. 1 include knobs 158, 258 which control the amount of vertical movement of the transfer heads 20, 40 when positioned at terminating stations 34, 37 respectively, and knobs 129, 229 which control the depth of wire and lead insertion at stations 34, 37.

To facilitate disclosure, the method of making leads by the apparatus of the present invention will now be described with reference to the schematic views of FIGS. 2 through 10, and the timing diagram of FIG. 11. This generalized description will be followed by a detailed description of the apparatus which enables the functions described.

FIG. 2 is a schematic perspective of the conductor handling components which include an idler wheel 12 and a driven wheel 15 which engage wire 2 upstream of flexible guide tube 17, which contains the wire 2 between wheels 12, 15 and the wire transfer head 20, which comprises clamping tube 27 fixed to slide 24 which is slidably carried in guide tracks 21 which are fixed to transfer head shaft 23. The wire 2 is clamped releasably in clamping tube 27 and extends therethrough to leading end 3 which is terminated. The leading end 3 is proximate to opposed cutting blades 30 which are flanked by opposed strip blades 31 on the side closest to the transfer head 20 and opposed strip blades 32 on the opposite side, nearest to lead transfer head 40. The lead transfer head 40 has movable jaws 50, 51 spaced opposite the axial line of wire 2, the jaws 50, 51 ride in a bracket 49 fixed to extension 47 of slide 44 which is slidably carried in tracks 41, which are in turn fixed relative to transfer head shaft 43. FIG. 2 corresponds to the 0° position on the timing diagram of FIGS. 11A and 11B.

FIG. 3 is a schematic perspective 56° into the cycle after wire 2 is fed through both transfer heads 20, 40 a distance determined by the number of revolutions of driven feed wheel 15. Referring as well to FIGS. 11A and 11B, the wire and lead clamping mechanisms have closed and the shearing of wire 2 by cutting blades 30 has just been completed to form lead 8.

FIG. 4 is a schematic perspective at 74° into the cycle, showing the wire 2 and lead 8 pulled back from cutting blades 30 while strip blades 31, 32 almost penetrate the insulation on wire 2 and lead 8 respectively.

FIG. 5 shows the conductor handling components at 107° into the cycle; here the wire 2 and lead 8 have been moved axially away from cutting blades 30 by the action of slides 24, 44 moving away from each other in tracks 21, 41 respectively; the slides 24, 44 paused from 74° to 84° while the strip blades 31 completely pierced the insulation on the leading end 3 of wire 2 while the strip blades 32 completely pierced the insulation on the trailing end 9 of lead 8. This is the limit of inward travel of the cutting blades 30 and strip blades 31, 32, which move as a unit. The distance of the strip blades 31, 32 from the cutting blades 30 is adjustable so that the lengths of insulation bits 4 stripped from the conductor may be predetermined.

FIG. 6 shows the components at the 128° position. The oppositely directed movement of slides 24, 44 was complete by 107°. From 107° to 134°, the blades 30, 31, 32 retreat and are shown almost fully retreated. The upward movement or "tonking" of shafts 23, 43 commenced at 106° and is now complete, 0.75 inches above the original level.

FIG. 7 shows the components at the 172° position; here the shafts 23, 43 have each been rotated through about 66° as shown. Press 35 has descended to trap closed barrel terminal 6 against anvil 36 and pauses temporarily; this action centers terminal 6 so that the leading end 3 can be accurately inserted. Press 38 continues its descent toward open barrel terminal 10 on anvil 39, but started later than press 35 and is not as far advanced. Terminals 6, 10 are fed into position on respective anvils 36, 39 during the descent of presses 35, 38.

FIG. 8 shows the conductor handling components at the 196° position; here the shafts 23, 43 have both been rotated through 90° to align the leading end 3 of wire 2 and the trailing end 9 of lead 8 with terminating stations 34, 37 respectively. The shaft 23 has tonked down to a level which is adjustable as required for a given terminal and applicator. Shaft 43 has tonked down 0.10 inches and and pauses at this level while press 38 continues its downward descent. Both slides 24, 44 have begun their advance toward terminating stations 34, 37 and the stacker arm 52 is advancing toward the point where it will pick up lead 8 with lead clamping jaws 53 open. This motion is fully synchronized in all cases, but it should be noted that the motion of presses 35, 38 as well as the tonking action may be synchronized or inverted to accommodate either type of terminal at either station.

FIG. 9 shows the components at the 220° position; here both shafts 23, 43 are fully tonked down and the leading end 3 of wire 2 is poked into terminal 6 while the trailing end 9 of lead 8 is positioned in open barrel terminal 10 while press 35 contacts closed barrel terminal 6 and press 38 begins crimping open barrel terminal 10. The stacker arm 52 is pausing in position for lead retrieval and the stacker arm jaws 53 are closed on the lead 8.

FIG. 10 shows the components at the 308° position; lead clamping jaws 50, 51 in bracket 49 have opened and the stacker arm 52 has picked up the finished lead and removed it from the transfer head 40. The shafts 23, 43 are 45° into the return cycle, and have been tonked back up while slides 24, 44 have retreated again. The only remaining motions are those necessary to return the components to the position of FIG. 1.

Figure 12:
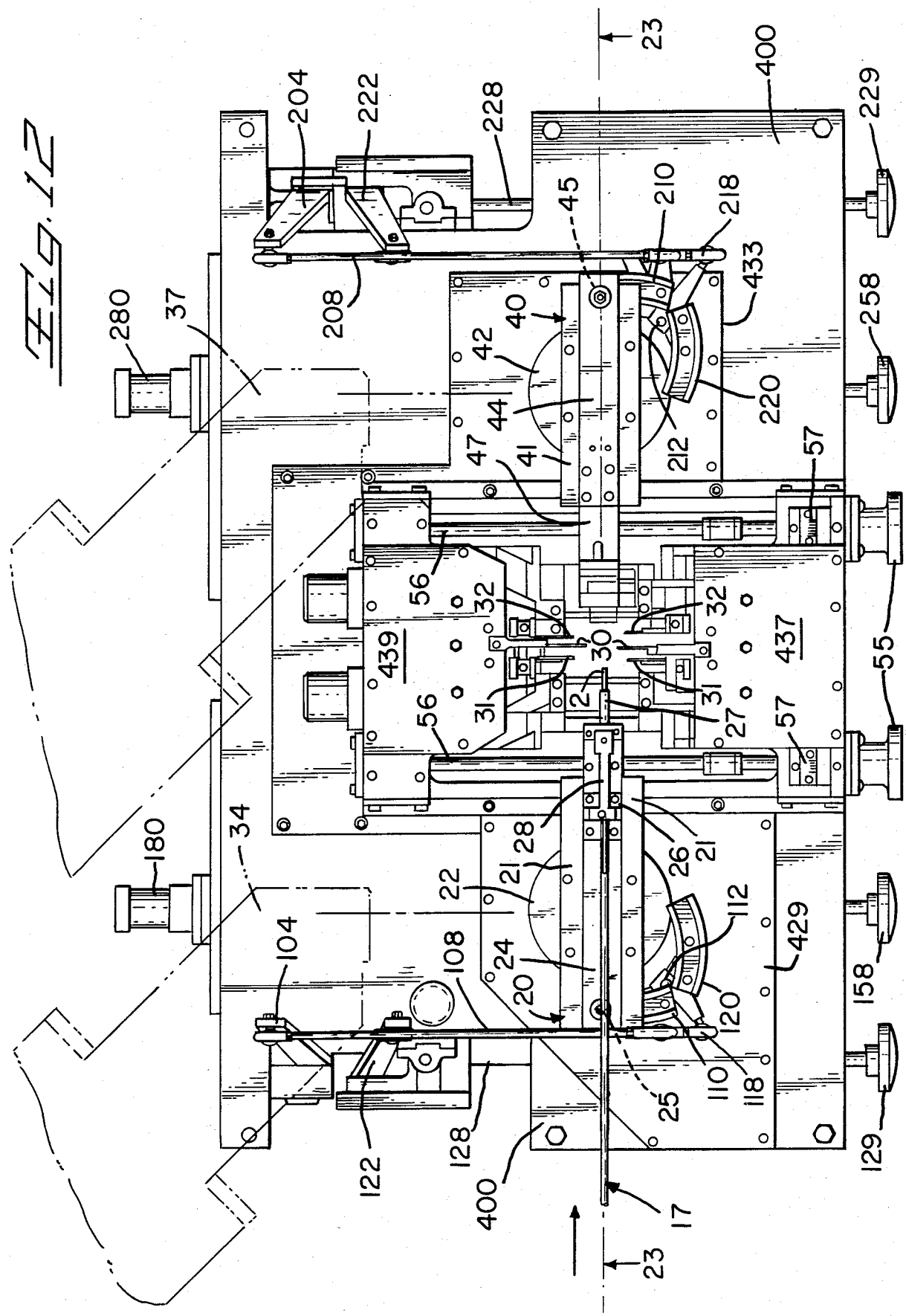
FIG. 12 is a plan view of the lead maker.

FIG. 12 is a plan view of the lead maker showing the wire transfer head 20 and lead transfer head 40 in position prior to wire feed, corresponding to 0° on the timing diagram. Cutting blades 30 and stripping blades 31, 32 are fully retracted. The distance of blade pairs 31, 32 from cutting blades 30 is adjusted by knobs 55 to rotate rods 56 and actuate linkage under covers 437, 439; the amount of insulation to be stripped is read on gages 57. Additional knobs 58 (FIG. 13) are used to regulate the inward travel of blades 31, 32 to fully pierce any thickness of insulation without piercing the conductor. These cut and strip mechanisms are not relevant to the present invention and need not be further described. Wire transfer head 20 comprises a slide 24 riding in track 21 fixed to transfer head support 22. The slide 24 carries a follower 25 journaled underneath which rides in first and second arcuate track segments 110, 120 respectively; these undergo angular movement from the skewed position shown by pivoting about pivot shaft 112 to form a ninety-degree arc of circular track which permits ninety-degree rotation of the head 20. Angular movement of segments 110, 120 is achieved by linear movement of first and second connecting rods 108, 118 respectively which is controlled by a camshaft as will be later described. Angular movement of track segments 110, 120 from the position shown causes the wire to be pulled back for stripping. The transfer head may then be rotated without imparting axial movement to the wire, which movement for wire termination is accomplished by angular movement of the track segments 120 back to the position shown. The lead transfer head 40 comprises a slide 44 riding in track 41 fixed to transfer head support 42. The slide 44 carries a follower 45 underneath which rides in arcuate track segments 210, 220. Movement of segments 210, 220 is as described for segments 110, 120. Note that all 100-series numerals (except as specifically noted) assigned to components on the left or wire feed side of the apparatus have a corresponding 200-series number on the right or lead eject side of the apparatus. All 400-series numerals refer to structural and other fixed components.

Figure 13:
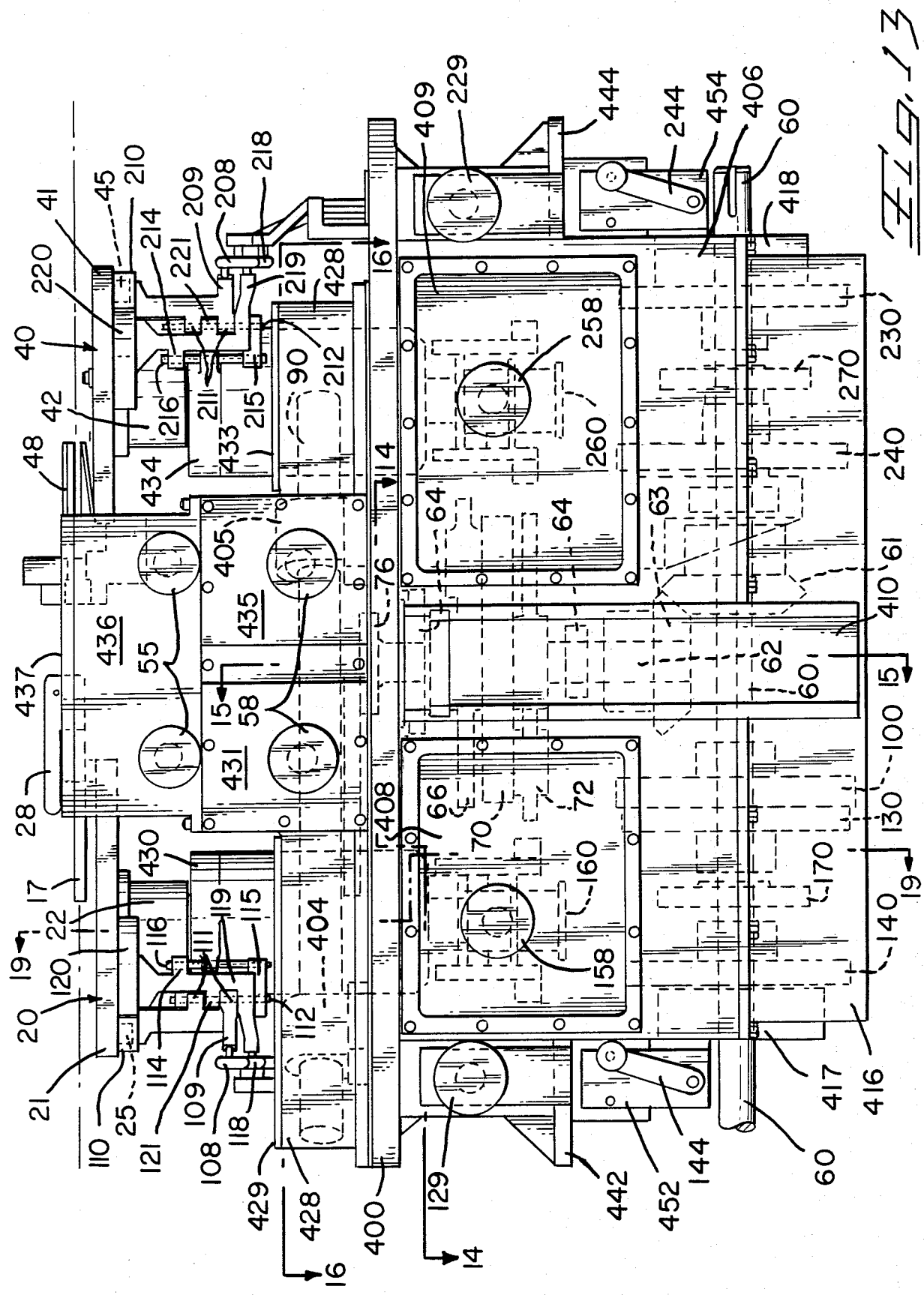
FIG. 13 is a front elevation of the lead maker.

FIG. 13 is a front elevation showing most of the major covers and cases, and major running gear in phantom. Main mounting case 406 is fixed to main mounting plate 400, which also provides support means at left and right ends thereof for suspending the apparatus on a stand, to which a cabinet is mounted as shown in FIG. 1. The main camshaft 60 is journaled in bearings 417 and 418 which are fit between the case 406 and oil pan 416 bolted thereto. The main camshaft 60 is driven by an electric motor through a clutch, a brake, and a speed reducer to the left of bearing 417. The clutch and brake permit stopping the camshaft 60 during wire feed as necessary with long lead lengths. (These elements are not relevant to the present invention and are not shown.) The main camshaft carries closed barrel tonk cams 130, 230, open barrel tonk cams 140, 240, jaw actuator cams 170, 270, and push-pull cam 100. Note that there is only one push-pull cam which effects movement of cam segments 110, 120, 210, 220 through connecting rods 108, 118, 208, 218 respectively and other linkage as will be described. Which of cams 130 or 140 controls tonking movement for closed barrel or open barrel terminals respectively is determined by lever 144 (shown in open barrel position) carried in bracket 452. Knobs 158, 258 mounted through front covers 408, 409 control amount of tonk (upward and downward movement) of the transfer heads 20, 40 at the presses, but due to function to tonk control barrels 160, 260 do not control tonk at the cut and strip position. Knobs 129, 229 control the depth of wire and lead insertion at terminating stations 34, 37 respectively by controlling amount of angular movement of tracks 120, 220 through linkage as will be described.

Referring still to FIG. 13, vertical camshaft 62 is driven by bevel gear 61 on shaft 60 which acts on bevel gear 63 on shaft 62 to give same at a 1:1 ratio. The shaft 62 is journaled in bearings 64 and carries primary index cam 66, transfer head sector gear 70, conjugate index cam 72, and cut and strip cam 76. The gear 70 and cams 66, 72 cause intermittent reciprocating movement of transfer head drive shaft 90 which by a rack and pinion arrangement causes the transfer heads 20, 40 to rotate. The drive shaft 90 is carried in journals 404, 405 bolted to the main mounting plate 400 in transfer drive case 428, which is covered on the left and right sides by covers 429, 433 respectively. Transfer head bushing retainers 430, 434 are mounted through covers 429, 433 and slidably carry yokes 114, 115, 214, 215 which carry pivot shafts 112, 212. Tracks 110, 120 pivot about pivot shaft 112 on journals 111, 121 respectively and are controlled through brackets 109, 119 respectively, which are integral with respective tracks 110, 120.

Figure 14:
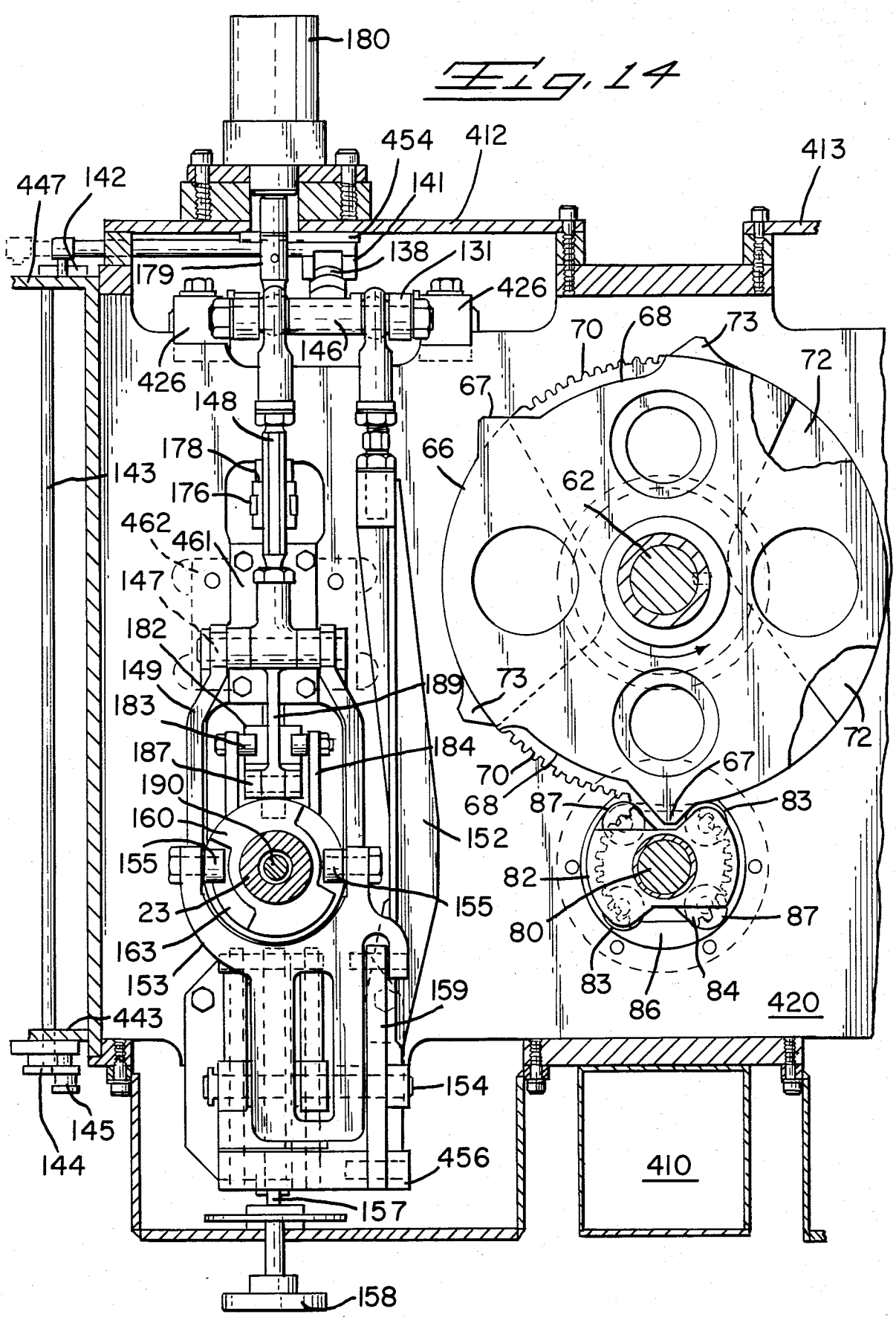
FIG. 14 is a plan view partially in section of the transfer head drive cam and tonk linkage taken along line 14—14 of FIG. 13.

FIG. 14 is a plan of the mechanism which imparts intermittent motion to the transfer heads, shown in the 130° position of the main camshaft 60 (FIGS. 11A and 11B). The vertical shaft 62 is rotating counterclockwise as shown and a lobe 67 of primary index cam 66 is about to contact a follower 83 in the primary cam follower holder 82, which will cause transfer head gear sector 70 to engage sector gear 84 to effect clockwise rotation of crankshaft 80. This motion continues until the other follower 83 kicks out of recess 68 and the next (looking counterclockwise) follower 87 on conjugate cam follower holder 86 rolls over a lobe 73 on the conjugate cam. Motion of the crankshaft 80 then stops until the next lobe 67 on the primary index cam 66 contacts the next follower 83; this pause corresponds to the dwell of the transfer heads at the presses corresponding to the 195° to 274° movement of the main camshaft 60; the transfer heads are then rotated back for a much longer dwell at the cut and strip position.

Figure 15:
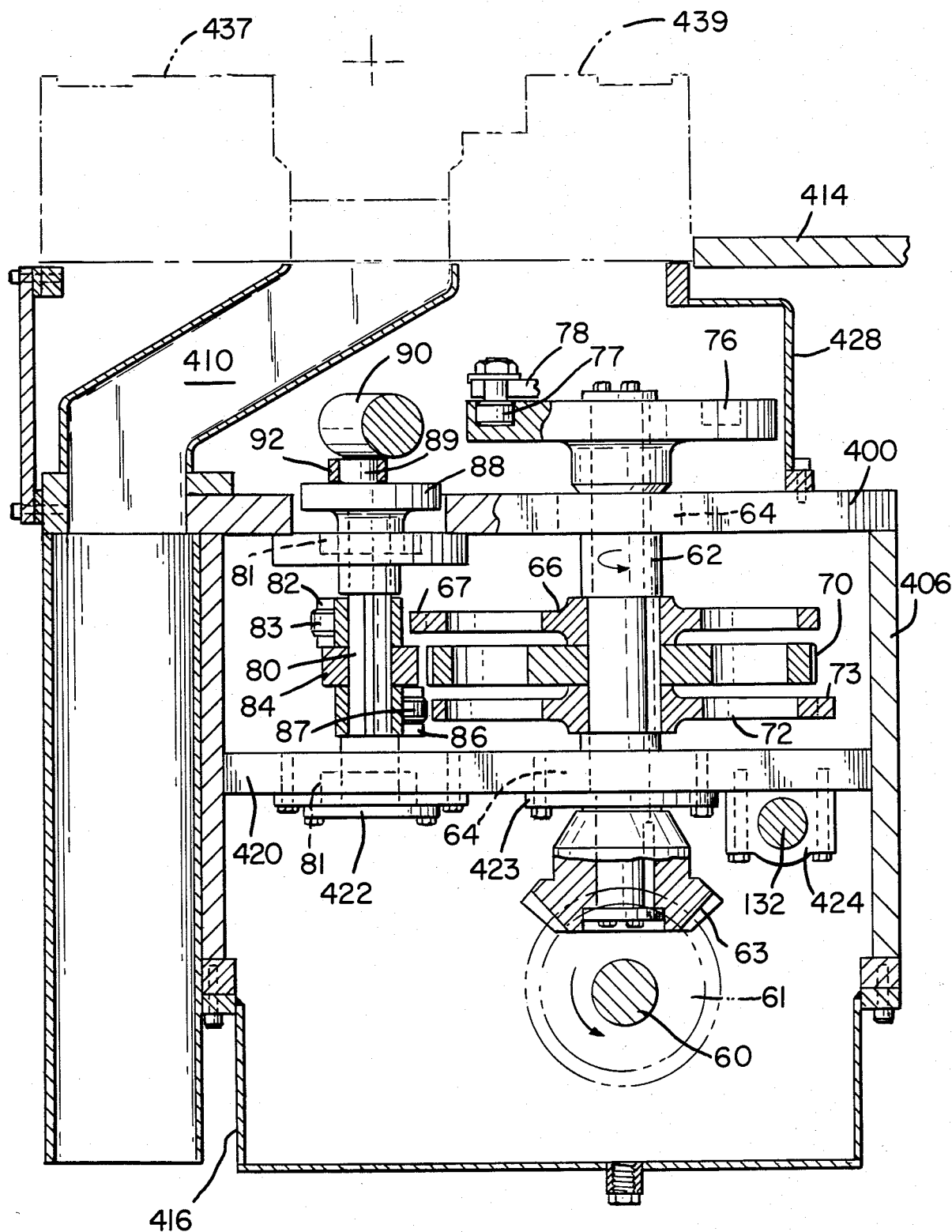
FIG. 15 is an elevational section of the transfer head drive taken along line 15—15 of FIG. 13.

FIG. 15 shows the above-described mechanism in vertical cross section. Intermediate mounting plate 420 in case 406 provides mounting points for bearing support plates 422, 423 which hold lower bearings 81, 64 for crankshaft 80 and vertical shaft 62 respectively. Main mounting plate 400 provides support for upper bearings 81, 64 on respective shafts 80, 60. The cams 66, 72 are in the 130° position of main camshaft 60 which was described in conjunction with FIG. 14. Crank 88 on crankshaft 80 has a crank pin 89 fitted therein which acts on pivot link 92 to move shaft 90 as will be shown in FIG. 16. Other salient features apparent in FIG. 15 are the scrap chute 410 which receives insulation bits falling from the strip blades, and press mounting plate 414 on which the press for terminating the leading end of the wire is mounted. Cut and strip cam 76 causes movement of link 78 by acting on follower 77 to impart motion to cut and strip blades previously described.

FIG. 16 again shows the cut and strip cam 76 on vertical shaft 62; additional linkage for the cut and strip mechanism is not critical to the present invention. Recall from description of FIG. 14 that clockwise motion of crankshaft 80 is intermittent and, therefore, reciprocating axial motion impart to shaft 90 by link 92 attached at pivot 93 is also intermittent. The drive shaft 90 has racks 94, 95 bolted thereto which act on pinion gears 96, 97 profiled on pinion shafts 98, 99 which are rotated with transfer head shafts 23, 43. The transfer head shafts 23, 43 have square profiles to key the pinion shafts 98, 99 thereon. The pinion shafts 98, 99 turn in lower bushing retainers 470, 474, which are cut away on this level to permit engagement of gears 96, 97 with racks 94, 95 respectively. The racks 94, 95 cause ninety degrees of rotation of the shafts 23, 43 necessary to move the transfer heads from the cut and strip to the terminating positions as the main camshaft rotates from 130° to 195° as shown on the timing diagrams of FIGS. 11A and 11B. The index cams 66, 72 (FIGS. 14 and 15) cause the shaft 90 to move only intermittently; the shaft 90 moves linearly in journals 404, 405. The transfer drive case 428 is fixed to main mounting plate 400 and encloses the transfer drive components shown.

FIG. 17 is an end view of the apparatus showing the "push-pull" linkage on the right-hand or lead terminating side of the machine. Main camshaft 60 carries a single push-pull tracking cam 100 which imparts motion to a single drive link 101 via follower 102 thereon to cause rotation of the single push-pull pivot shaft 103. Parallel first lever arms 104, 204 at opposite ends of main camshaft 60 thus oscillate with rotation of shaft 60. Only the 200-series components will be hereinafter described with reference to FIG. 17, but recall that like-numbered 100-series components at the wire feed end of the apparatus undergo like movements. The first lever arm 204 has a first connecting rod 208 pivotably attached to the upper end thereof by a ball joint; the rod 208 also has a ball joint at the opposite end thereof where it is pivotably attached to bracket 209, which is integral with track 210. Here the camshaft 60 is in the 107° to 130° stage of rotation; pull-back to strip wires has been completed and the track segments 210, 220 are juxtaposed to form a circular arc of track, before rotation of head 40 begins. A second lever arm 222 rocking on pivot pin 225 is driven by first arm 204 through connecting link 205, thus causing arms 204, 222 to move in unison albeit in opposite angular directions. The arm second 222 acts on second connecting rod 218 through a ball joint at the upper end of arm 222; second rod 218 thus moves leftward as first rod 208 moves rightward. These motions begin when the follower 45 is in track 220 as transfer head 40 rotates toward the termination position; arm 204 undergoes clockwise motion from 182° to 212° of camshaft rotation so that slide 44 moves forward for wire insertion. FIG. 17 offers another vantage of the mounting of track segments 210, 220; guide shaft 217 is fixed to bushing retainer 434 and permits vertical movement of tracks 210, 220 by yokes 214, 215 journaled on shafts 216, 217 (216 shown in FIG. 13). See also FIGS. 18A and 18B.

FIG. 17 depicts an important feature of the invention, the adjustability of the angular travel of track 220, which in turn affects the depth of insertion of the stripped trailing end of a lead into a terminal. Pivot 225 is carried in yoke 224 which slides vertically in bracket 448 under the action of screw shaft 226, which passes through a threaded bore in yoke 224. Screw shaft 226 is rotated simultaneously with adjusting shaft 228 through a pair of bevel gears 227 on adjacent ends of shafts 226, 228; the shaft 228 is rotated by manually turning knob 229, and is supported at the forward end through bracket 444. Note that pivot pin 225 rides vertically through a slot 223 in arm 222 to change the distance of the pivot pin 225 from the upper end of the arm 222 thus changing the amount of travel of the upper end of arm 222. The arm 222 does not move vertically because the pivot pin 206 at the lower end thereof extends through slot 449 in stationary bracket 448.

FIG. 18A is a plan view of the wire transfer head 20 which corresponds to the FIG. 17 end view of the lead transfer head 40; the slide 24 has been fully pulled back in slide tracks 21 to strip the wire as the tracks 110, 120 are juxtaposed and form a circular path of travel for follower 25. Compare the position before pull-back to strip shown in FIG. 12. The transfer head 20 then rotates through 90° as the camshaft rotates from 130° to 195° (see timing diagram, FIGS. 11A and 11B). Note that the "poke-in" or angular movement of tracks 110, 120 commences before rotation of head 20 is complete, but after the follower 25 has entered track 120. FIG. 18B shows the transfer head 20 as rotation ceases (at camshaft 195°), while rods 108, 118 continue moving in opposite directions to effect clockwise rotation of track 110 and counterclockwise rotation of track 120 through movement of respective integral brackets 109, 119. The amount of rotation of track 120 will depend on the adjusted height of pivot 125 (see discussion of pivot 225 with FIG. 17 above). Tracks 110, 120 pivot about pivot shaft 112 which is carried in upper and lower sliding yokes 114, 115 which are arranged for vertical movement only on guide shafts 116, 117.

Figure 19:
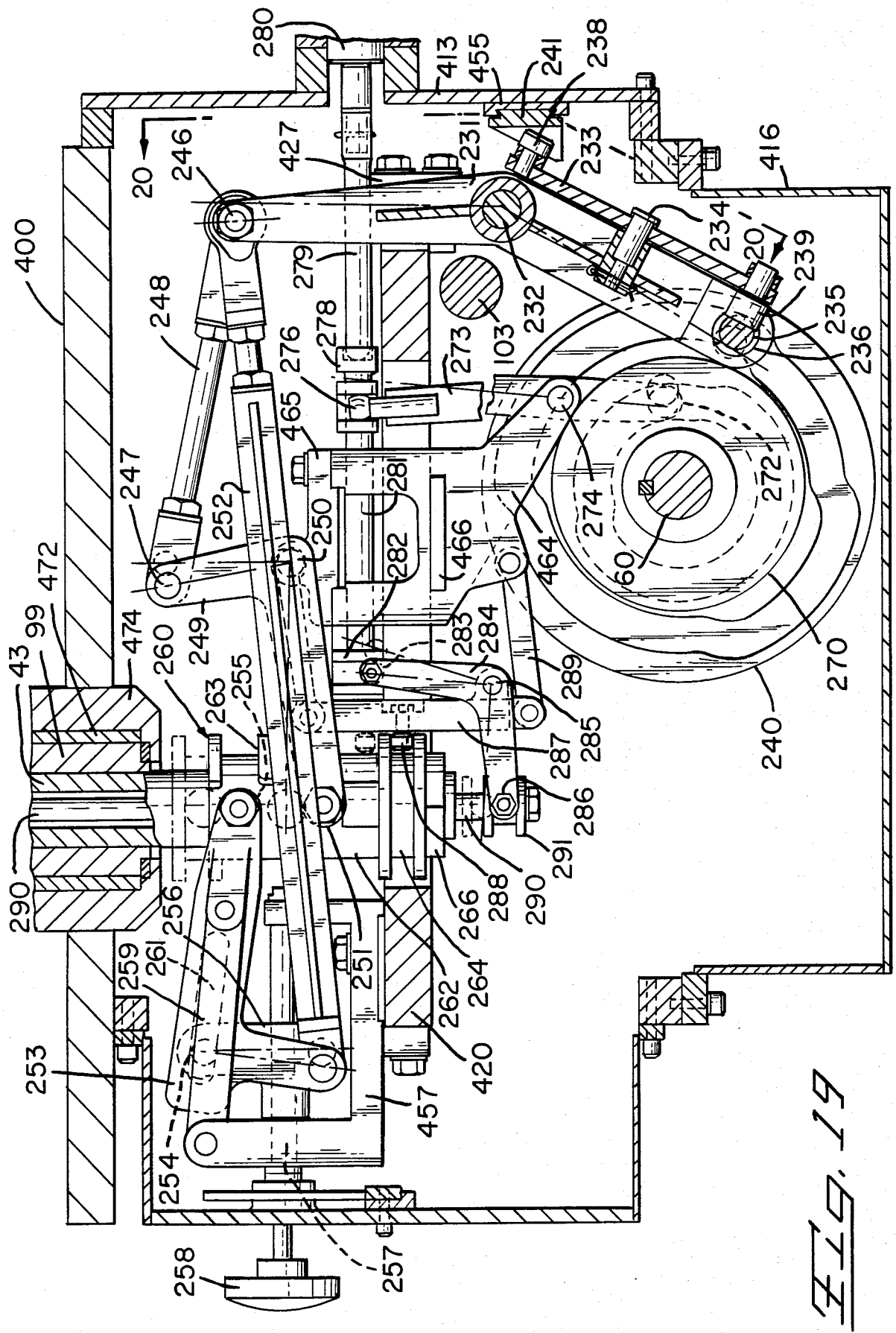
FIG. 19 is a section view showing the tonk transfer linkage and wire jaw actuating mechanism taken along line 19—19 of FIG. 13.

FIG. 19 is a section view showing the tonk transfer linkage and wire jaw actuating mechanism taken along line 19—19 of FIG. 13. This linkage (excepting cams) is also shown in partially exploded perspective in FIG. 22, to which the following description will apply; see also FIG. 14 for a plan view of corresponding parts (100-series numerals) on the left or wire transfer head side of the machine, and FIGS. 24A and 24B for surface profiles of the cylindrical tracking cams 160, 260, referred to hereinafter as tonk control barrels 160, 260. The open barrel tonk cam 240 is shown at 0° in the cycle of camshaft 60, just as downward travel of tonk control barrel 260 is complete. Follower 236 is carried on one end of lower shaft 235 which is carried on a drive link in the form of shifter frame 231; the opposite end of shaft 235 carries a follower 237 which is engaged with the closed barrel tonk cam 230 by shifting the cam shifter 233 counter-clockwise as viewed in FIG. 21. Frame 231 pivots on pivot shaft 232, which is journaled in rocker brackets 427 (426 on left side of machine), to cause reciprocating movement of upper shaft 246 carried at the top of shifte frame 231. A connecting rod 248 is journaled at one end to upper shaft 246 and at the opposite end to pivot shaft 247, which is carried in the upper arms of L-link 249. Link 249 pivots about pin 250 which is carried by top plate 465 on stationary bracket 464, which is fixed to intermediate plate 420 by mounting blocks 466. (On the left side of the apparatus, L-link 149 pivots on pin 150 carried by top plate 461 on stationary bracket 460, which is fixed to intermediate plate 420 by mounting blocks 462.) Followers 251 journaled to the ends of horizontal arms of L-link 249 ride in lower guide track 262 of tonk control barrel 260.

Referring still to FIGS. 19, 22, and 14, control rod 252 is also journaled to upper shaft 246 and thus undergoes movement synchronous with rod 248. Rod 252 is pivotably attached to the lower arm of L-link 253, which pivots about shaft 254 carried in adjusting block 256. Followers 255 journaled to the ends of horizontal arms of L-link 253 ride in upper guide track 263 of tonk control barrel 260. Adjusting block 256 is slidably mounted in tonk adjusting bracket 457 (456 on left side of apparatus) which also carries threaded shaft 257 which also passes through a tapped bore in block 256. Knob 258 on the end of shaft 257 thus serves to regulate the horizontal position of pivot shaft 254 which is situate in slot 261 in L-link 253. Horizontal migration of L-link 253 with adjusting block 256 is prevented by horizontal link 259 between the L-link 253 and the adjusting bracket 457. The height of travel of followers 255 is thus regulated by turning knob 258 to alter the angular orientation of L-link 253.

Figure 24A:
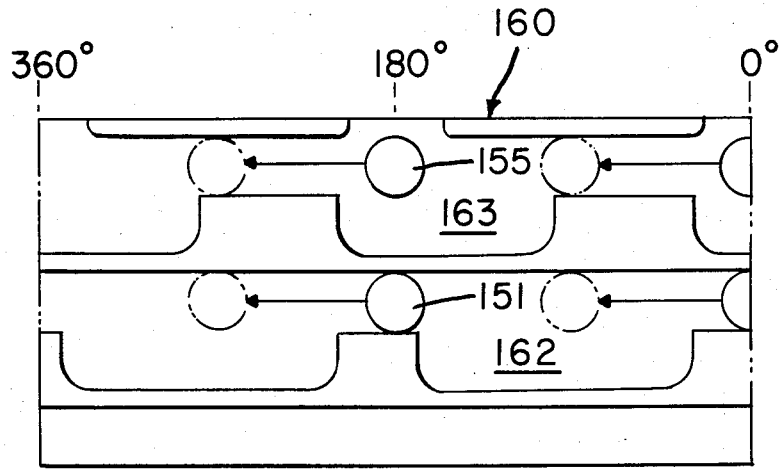
FIGS. 24A and 24B are schematics of the surface of the tonk control barrel.
Figure 24B:
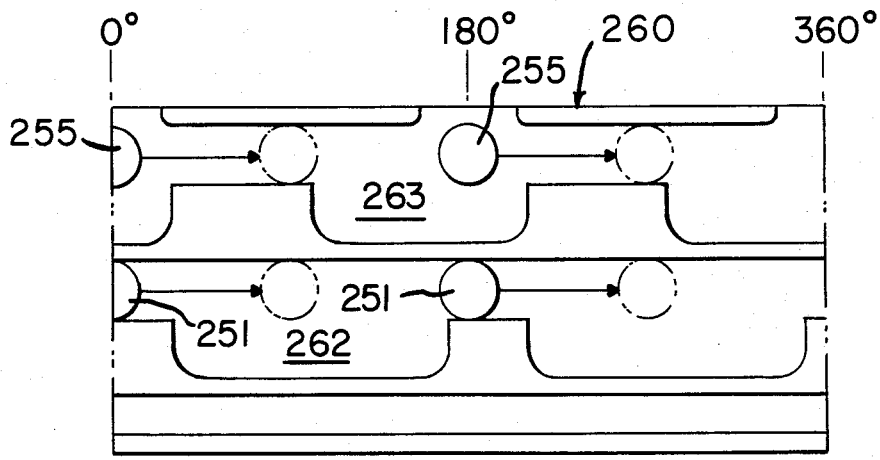

Referring to FIGS. 19 and 22, the tonk control barrel 260 is fixed to transfer head shaft 43 by split collar 266 and is secured against rotation relative thereto by a key 267. Pinion shaft 99 (98 on left side) rotates with transfer head shaft 43 (42 on the left side) above the barrel 260 and provides rotary drive means as described in conjunction with FIGS. 15 and 16. The shafts 98, 99 are keyed to shafts 42, 43 to permit relative vertical movement while the shafts 98, 99 rotate with respective shafts 42, 43, which turn in lower bushings 472 in respective lower bushing housings 470, 474. Thus, the gears 96, 97 (FIG. 22) do not move vertically. FIGS. 24A and 24B depict the surfaces of tonk control barrels 160, 260 and the relative positions of followers 151, 155, 251, 255 therein as the barrels are rotated 90°. FIG. 24B shows followers 251, 255 in the initial position (solid lines) and in the final position (phantom) after the barrel rotation which aligns a lead for termination. Prior to rotation of the barrel 260, follower 251 fits snugly in track 262, while follower 255 is in an open section of track 263. Thus the tonk height immediately following the cut and strip operation is not adjustable; i.e., the upward travel of the transfer heads following cutting and stripping is not adjustable. This tonk or vertical movement of the transfer heads 20, 40 is necessary to clear the cut and strip mechanism during rotation of the heads 20, 40. After the barrel 260 is rotated 90°, the follower 255 fits snugly in track 263 while follower 251 is in an open section of track 262. Thus the tonk height immediately preceding the termination operation is adjustable; i.e., the downward travel of the transfer heads for termination is adjustable, as is desirable for different size terminals and different applicators. The above described arrangement makes the vertical movement of conductor at the presses independent of vertical movement at the cut and strip position.

Referring again to FIGS. 19, 22 and 14, jaw actuator cam 270 controls the movement of a follower 272 journaled to the lower end of lever arm 273 which rocks on a pivot 274 in stationary bracket 464. A fork 276 fixed to the upper end of arm 273 rides in a slider block 278 which pushes air cylinder shaft 279 rightward into air cylinder spring 280 when the wire clamp is required to be open. The slider block 278 slides freely on rod 281 at all other times, allowing the air cylinder to push rod 281 leftward as the camshaft 60 rotates. A second slider block 282 fixed to the other end of rod 281 acts on followers 283 at the upper end of L-link 284 to cause link 284 to pivot about pivot 285 fixed in vertical link 287, which causes followers 286 in guide track 291 to move vertically. The guide track 291 is fixed to the wire jaw actuating shaft 290 and shaft 290 thus moves vertically through transfer head shaft 43 to actuate wire jaws as will be discussed in conjunction with FIG. 23. Note well that pivot 285 undergoes no vertical movement relative to tonk control barrel 260, as follower 288 carried on vertical link 287 rides in circular track 264 on the bottom of tonk control barrel 260. The vertical link 287 is pivotably attached to stationary bracket 466 by a pair of parallel horizontal links 289 which extend between opposite ends of link 287 and the bracket 464, thus confining link 287 to vertical movement paralleling the control barrel 260. Air cylinder shaft 279, which is attached to air cylinder 280, assures positive return of the wire jaw actuating shaft 290 (100-series counterparts are shown in plan in FIG. 14).

Figure 20:
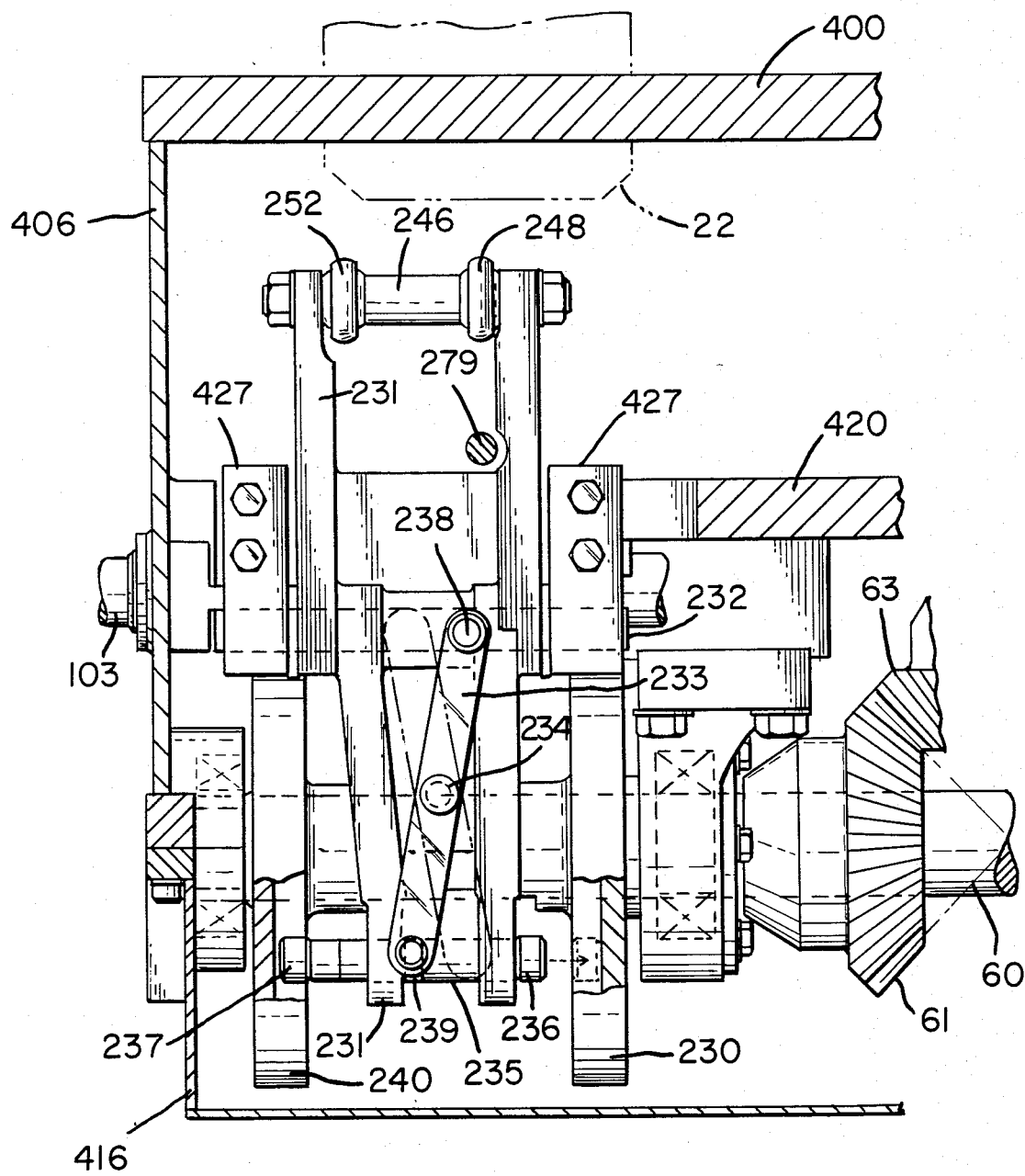
FIG. 20 is a section view of the cam shifter linkage taken along line 20—20 of FIG. 19.

FIG. 20 is an elevation taken from the right rear of the apparatus showing the linkage which shifts lower shaft 235 so that first follower 236 engages first or closed barrel tonk cam 230 or so that second follower 237 engages second or open barrel tonk cam 240. This is accomplished by shifter 233, which is journaled to pivot pin 234 on shifter frame 231. The lower end of shifter 233 has shifter key 239 journaled therein; the shifter key 239 has a rectangular portion which fits snugly in a like profiled slot in lower shaft 235, so that horizontal shifting of follower 238 journaled to the upper end of the shifter 233 will cause engagement of open barrel tonk cam 230 or closed barrel tonk cam 240. The linkage used to shift follower 238 is shown in FIGS. 14, 17, 19, and 21. FIG. 14 shows the similar 100-series linkage on the left side of the machine in plan; follower 138 rides in a vertical slot in one end of slide 141 which is dovetailed to slide horizontally in track 454 fixed to rear plate 412. (On the right side, follower 238 rides in slide 241 which is dovetailed in track 455 fixed to rear plate 413. See FIG. 19.) The other end of slide 141 has a pin fixed thereto which rides in a forked lever 142 fixed on the end of control rod 143, which passes through front and rear brackets 443, 447 respectively and is rotated by lever 144 and knob 145 on the front end of rod 143. (On the right side of the machine, see FIG. 21, rod 243 passes through brakets 445, 449 and is rotated by lever 244 and knob 245. See FIG. 17.) FIG. 21 is an elevation view of lever 243 and bracket 445; rotating knob 245 will shift rod 241 leftward so that closed barrel cam 240 controls the oscillating movement of shifter frame 231 and thus the motion of tonk control barrel 260 (FIGS. 19, 22).

The above described linkage for shifting control of the tonk or vertical movement of the transfer head 20 from tracking cam 130 to tracking cam 140 and control of transfer head 40 from cam 230 to cam 240 is an important feature of the invention insofar as it allows ready shifting from open barrel termination to closed barrel termination. As shown in FIGS. 11A and 11B, the closed barrel cams 130, 230 cause the tonk to be completed before the slides 24, 44 fully advance the conductor, while open barrel cams 140, 240 delay the final stage of vertical movement until the conductor is fully advanced to overlie the terminals.

Figure 23:
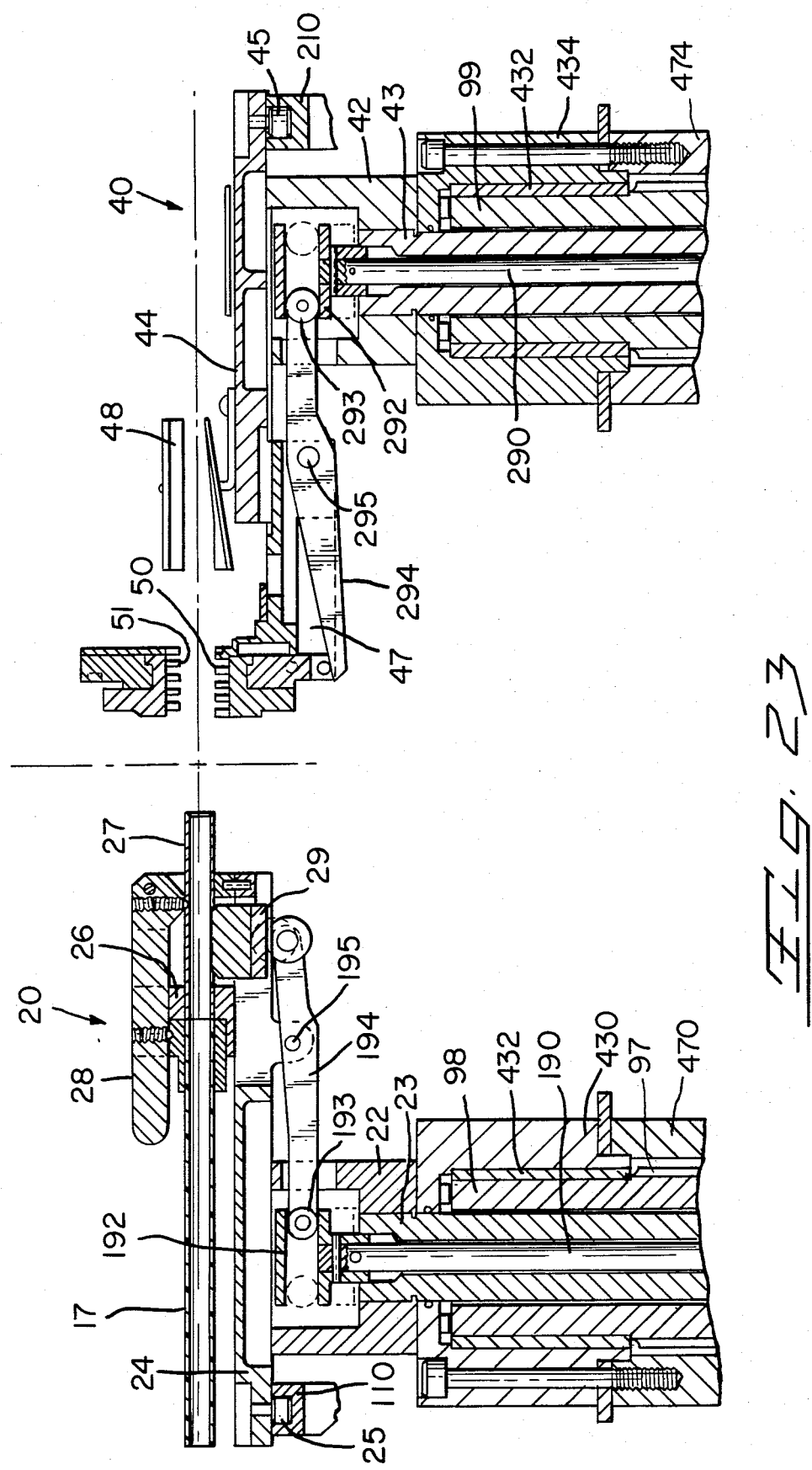
FIG. 23 is a sectional view of the transfer heads taken along lines 23—23 of FIG. 12.

FIG. 23 is an elevational section of the transfer heads 20, 40 taken along line 23—23 of FIG. 12. Wire jaw actuating shafts 190, 290 undergo vertical movement relative to transfer shafts 23, 43 as discussed in conjunction with FIGS. 19, 22, and 14. The shafts 23, 43 thus effect vertical movement of respective slide tracks 192, 292 within supports 22, 42 to which respective transfer heads 20, 40 are fixed. Vertical movement of slides 192, 292 causes vertical movement of followers 193, 293 on lever arms 194, 294, which pivot about respective pivot pins 195, 295 fixed to slides 24, 44 respectively; this actuates clamping mechanisms in respective heads 20, 40. Lever 194 bears against wire clamp 29, causing it to move upward into a slot in clamping tube 27 to clamp the wire therein. The guide tube 27 may be removed from bracket 26 on slide 24 by releasing tube clamp 28 which is fixed pivotably to bracket 26. Lever 294 bears against lower clamp jaw 50, causing it to move upward toward upper clamp jaw 51. A vertical link (not shown) attached to lower clamp jaw 50 likewise moves upward and acts on a rocker which causes the upper clamp jaw 51 to move downward. The open configuration of clamp jaws 50, 51 and open-sided wire guide 48 permit ready removal of a finished lead by the stacker arm 52 (FIG. 1). As cam tracks 110, 210 pivot relative to bushing retainers 430, 434 respectively, followers 25, 45 move toward or away from each other causing like horizontal movement of slides 24, 44 in slide tracks 21, 41 (FIG. 17) fixed to respective head supports 22, 42. This motion causes followers 193, 293 to move in respective slides 192, 292 so that pivoting of tracks 110, 210 (as well as tracks 120, 220, FIG. 12) does not affect movement of respective wire and lead clamping mechanisms, and vice-versa.

The foregoing description is exemplary and not intended to limit the scope of the claims which follow.

We claim:

1. Lead making apparatus of the type comprising a pair of normally aligned conductor transfer heads, each said transfer head being fixed on a vertical transfer head shaft, conductor cutting and stripping means comprising closable blades positioned between said transfer heads, conductor feed means for feeding a predetermined length of wire through said transfer heads and between said blades, a pair of conductor terminating stations remote from said cutting and stripping means, means for rotating the transfer heads from their normally aligned positions to positions adjacent respective terminating stations, said means for rotating said transfer heads acting on said transfer head shafts, means for moving each of said transfer heads vertically, a slide member on each of said transfer heads, each said slide member being movable toward and away from said blades when said heads are aligned, and toward and away from said terminating stations when said transfer heads are adjacent the terminating stations, and clamping means on each of said slide members for clamping fed conductor at the conclusion of feeding thereof, characterized in that each said means for moving a transfer head vertically comprises a cylindrical tracking cam fixed to the respective transfer head shaft, each said cam having an upper circumferential track and a lower circumferential track, said tracks having respective upper and lower cam followers therein, said cam followers being carried by means for moving said followers vertically, said cam followers traveling through respective tracks as the shaft is rotated, only one of said tracks on each cam being profiled to closely contain the respective follower when the heads are aligned, only the other said track on each cam being profiled to closely contain the respective follower when the heads are adjacent the terminating stations, whereby only one of said followers controls vertical movement at each said position of the heads.

2. Lead making apparatus as in claim 1 characterized in that said means for moving said followers vertically comprises a pair of upper links which carry respective upper followers and a pair of lower links which carry respective lower followers, each of said links pivoting about a respective pivot point, said apparatus having means for changing the distance between at least one of said pivot points for each pair of transfer heads and the respective follower, whereby the amount of vertical movement of the transfer heads may be adjusted at at least one said position of each transfer head by changing said distance.

3. Lead making apparatus as in claim 2 characterized in that each said pair of upper and lower links is driven by a pair of respective upper and lower connecting rods, each pair of connecting rods being driven by a single driven link, said driven link pivoting according to the movement of a first follower carried thereby, said said follower riding in a first tracking cam.

4. Lead making apparatus as in claim 3 characterized in that each said driven link carries a second follower on a shaft common to said first follower, said followers being on opposite ends of said shaft, said driven link carrying shifting means for axially moving said shaft so that said second follower rides in a second tracking cam on a common shaft with said first tracking cam, whereby each transfer head may be shifted between two differently timed vertical movements.

5. Lead making apparatus as in claim 2 characterized in that each link carries two diametrically opposed followers riding in a single circumferential track on each of said cylindrical tracking cams, said tracks having radial symmetry.

6. Lead making apparatus as in claim 1 characterized in that said means for rotating the transfer heads comprises a pinion gear on each transfer head shaft, each said gear being fixed against rotation relative to said shaft, said pinion gears being driven by a single reciprocating rack which is driven intermittently.

7. Lead making apparatus of the type comprising a pair of normally aligned conductor transfer heads, each said transfer head being fixed on a vertical transfer head shaft, conductor cutting and stripping means comprising closable blades positioned between said transfer heads, conductor feed means for feeding a predetermined length of wire through said transfer heads and between said blades, a pair of conductor terminating stations remote from said cutting and stripping means, means for rotating the transfer heads from their normally aligned positions to positions adjacent respective terminating stations, said means for rotating said transfer heads acting on said transfer head shafts, means for moving each of said transfer heads vertically, a slide member on each of said transfer heads, each said slide member being movable toward and away from said blades when said heads are aligned, and toward and away from said terminating stations when said transfer heads are adjacent the terminating stations, and clamping means on each of said slide members for clamping fed conductor at the conclusion of feeding thereof, characterized in that each said means for moving a transfer head vertically comprises a cylindrical tracking cam fixed to the respective transfer head shaft, each said cam having a circumferential track having a cam follower therein which moves through the track as the shaft is rotated, said cam follower being journaled to a link which pivots to move the shaft vertically, said link being driven by a connecting rod which is reciprocably driven by a shifter frame, said shifter frame pivoting about a rocker shaft parallel to a cam shaft carrying first and second tracking cams which flank the shifter frame, said shifter frame slidably carrying a lower shaft parallel to said rocker shaft, said lower shaft having first and second followers axially journaled to opposite ends thereof, said frame further carrying linkage for shifting said lower shaft axially in one direction so that said first follower engages said first tracking cam and axially in the opposite direction so that said second follower engages said second tracking cam, whereby two distinct timings of vertical transfer head movement may be achieved.

* * * * *

UNITED STATES PATENT OFFICE
CERTIFICATE OF CORRECTION

Patent No. 4,489,476     Dated December 25, 1984

Inventor(s) William R. Over, Donald A. Wion, and Richard M. Heffner

It is certified that error appears in the above-identified patent and that said Letters Patent are hereby corrected as shown below:

Column 12, line 25, change the word "said" to the word --first--.

Signed and Sealed this

Sixteenth Day of July 1985

[SEAL]

Attest:

DONALD J. QUIGG

Attesting Officer    Acting Commissioner of Patents and Trademarks